United States Patent
Kuroda et al.

(10) Patent No.: US 7,041,030 B2
(45) Date of Patent: May 9, 2006

(54) HYDRAULIC CONTROL APPARATUS FOR HYBRID VEHICLE

(75) Inventors: Shigetaka Kuroda, Utsunomiya (JP); Naohisa Morishita, Utsunomiya (JP); Kazuhisa Yamamoto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 146 days.

(21) Appl. No.: 10/643,931

(22) Filed: Aug. 20, 2003

(65) Prior Publication Data

US 2004/0038774 A1 Feb. 26, 2004

(30) Foreign Application Priority Data

Aug. 22, 2002 (JP) .................... 2002-242304

(51) Int. Cl.
*H02P 7/04* (2006.01)
*B60K 41/02* (2006.01)

(52) U.S. Cl. ............... 477/21; 477/4; 477/171; 477/173; 477/185; 477/200; 477/203

(58) Field of Classification Search ............ 477/4, 477/21, 92, 171, 173, 183–185, 199, 200, 477/203
See application file for complete search history.

(56) References Cited

U.S. PATENT DOCUMENTS

| | | | | |
|---|---|---|---|---|
| 6,388,407 B1 * | 5/2002 | Eguchi | .................. | 318/376 |
| 6,547,344 B1 * | 4/2003 | Hada et al. | .................. | 303/191 |
| 6,702,718 B1 * | 3/2004 | Tani et al. | .................. | 477/203 |
| 6,799,109 B1 * | 9/2004 | Nakamori et al. | ............ | 701/54 |
| 2004/0029677 A1 * | 2/2004 | Mori et al. | .................... | 477/3 |

FOREIGN PATENT DOCUMENTS

| | | |
|---|---|---|
| JP | 08-014076 | 1/1996 |
| JP | 9-209790 | 12/1997 |
| JP | 11-303981 | 11/1999 |
| JP | 2000-052816 | 2/2000 |
| JP | 2000-186585 | 4/2000 |
| JP | 2000-264096 | 9/2000 |
| JP | 2001-099282 | 4/2001 |
| JP | 2001-182814 | 7/2001 |
| JP | 2002-039353 | 2/2002 |
| JP | 2002-115579 | 4/2002 |
| JP | 2002-309985 | 10/2002 |
| JP | 2003-074683 | 3/2003 |
| JP | 2003-172165 | 6/2003 |
| JP | 2003-172444 | 6/2003 |
| JP | 2003-240110 | 8/2003 |
| JP | 2003-262266 | 9/2003 |
| JP | 2003-278901 | 10/2003 |
| JP | 2003-294122 | 10/2003 |

\* cited by examiner

*Primary Examiner*—Tisha Lewis
(74) *Attorney, Agent, or Firm*—Arent Fox PLLC

(57) ABSTRACT

A hydraulic control apparatus for a hybrid vehicle, which enables a smooth torque transmission when an engine of the vehicle is started from an idling stop state. The hydraulic control apparatus includes an engine and a motor as power sources, a transmission having a torque converter, a clutch for a starting gear, an engine automatic stop and start device which is associated with the engine, a motor-driven oil pump for supplying oil pressure to the transmission, a brake pedal sensor, an accelerator pedal sensor, an engine revolution rate sensor. The oil pressure applied to the clutch is controlled to a level corresponding to a creeping torque when the engine is automatically stopped. When the brake pedal is released, the engine is automatically started, the accelerator pedal is not depressed, and the engine revolution rate is less than an idling revolution rate, the oil pressure applied to the clutch is maintained to the level corresponding to the creeping torque.

11 Claims, 11 Drawing Sheets

HYDRAULIC CONTROL APPARATUS FOR HYBRID VEHICLE

BACKGROUND OF THE INVENTION

1. Field of the Invention

The present invention relates to a hydraulic control apparatus for an automatic transmission installed in a hybrid vehicle.

2. Description of the Related Art

In recent years, in order to reduce fuel consumption for driving an engine and to reduce the amount of exhaust gas that is produced by combusting the fuel, hybrid vehicles have been developed in which an engine and a motor capable of power generation (hereinafter referred to as a motor-generator) are associated with a power transmission mechanism that is connected to driving wheels of a vehicle, driving power during travel of the vehicle is augmented by the motor-generator as necessary, while on the other hand, the power being input to the driving wheels during deceleration of the vehicle is transmitted to the motor-generator so that the motor-generator performs a regenerative operation so as to convert the deceleration energy into regenerated energy which is stored in a battery device as electrical energy.

In some such hybrid vehicles, in order to further improve fuel economy and to further reduce the amount of exhaust gas, a so-called idling stop control is executed in which the engine is automatically stopped by stopping fuel supply to the engine under predetermined conditions such as when the vehicle is stopped.

In the case in which a hydraulically-operated automatic transmission having a torque converter is employed in the above-mentioned hybrid vehicle, hydraulic pressure for a gearing mechanism in the automatic transmission is ensured by an oil pump that is driven by the engine when the engine runs; however, hydraulic pressure for the gearing mechanism cannot be ensured when the above-mentioned idling stop control is executed because the oil pump is also stopped and oil line pressure in the automatic transmission becomes zero.

When the engine is restarted upon receiving an engine starting command under conditions in which the oil line pressure is zero, consequently, the oil pump is also operated, and the oil line pressure steeply increases from zero, which may inhibit unrestricted control operation for oil pressure of a clutch. As a result, the driving torque of the engine may not be smoothly transmitted to an output shaft of the vehicle, which may cause jolting of the vehicle. Moreover, the clutch in the automatic transmission may slip when the oil line pressure steeply increases from zero, which may decrease the life of the clutch.

A hybrid vehicle is disclosed in Japanese Unexamined Patent Application, First Publication No. Hei 09-209790 in which the engine is restarted upon detecting release of the brake pedal during an idling stop operation so as to operate the engine-driven oil pump so that the oil line pressure of the automatic transmission is generated before the accelerator pedal is depressed.

Another hybrid vehicle is disclosed in Japanese Unexamined Patent Application, First Publication No. 2000-186585 in which a motor-driven oil pump is employed, instead of an engine-driven oil pump, for generating hydraulic pressure for the gearing mechanism. This document also discloses a control process in which the engine is restarted when the brake pedal and the accelerator pedal are simultaneously depressed during an idling stop operation.

However, details of the control operations for oil line pressure and hydraulic pressure for the clutch associated with the automatic transmission are not disclosed at all in the above-mentioned documents.

SUMMARY OF THE INVENTION

In view of the above circumstances, an object of the present invention is to provide a hydraulic control apparatus for a hybrid vehicle which enables a smooth transmission of torque in a transmission in accordance with increase in the engine torque after the engine is started upon receiving an engine start request command during an idling stop operation.

In order to achieve the above object, the present invention provides a hydraulic control apparatus for a hybrid vehicle including: an engine and a motor as power sources of the hybrid vehicle; a transmission which is provided for transmitting powers of the engine and the motor to output shafts of the hybrid vehicle, and which includes a torque converter, a starting gear, and a clutch that controls an engagement state of the starting gear by being supplied with oil pressure; a hydraulic control circuit associated with the transmission; a motor-driven oil pump for supplying oil pressure to the hydraulic control circuit and the clutch; an engine automatic stop and start device which is associated with the engine in order to stop and start the engine under predetermined conditions; a control unit which is operatively connected to the engine automatic stop and start device, the motor-driven oil pump, and the hydraulic control circuit; a brake pedal depression detecting device which is provided for detecting whether the brake pedal of the hybrid vehicle is depressed, and which is connected to the control unit; an accelerator pedal depression detecting device which is provided for detecting whether the accelerator pedal of the hybrid vehicle is depressed, and which is connected to the control unit; and an engine revolution rate measuring device which is provided for sensing revolution rate of the engine, and which is connected to the control unit, wherein the control unit is adapted to control the motor-driven oil pump and the hydraulic control circuit so that the oil pressure applied to the clutch is set to be a first oil pressure while the engine is automatically stopped, wherein the control unit is adapted to operate the engine automatic stop and start device so as to start the engine when it is determined by the brake pedal depression detecting device that the brake pedal is released while the engine is automatically stopped, and wherein the control unit is adapted to control the motor-driven oil pump and the hydraulic control circuit so that the oil pressure applied to the clutch is maintained to be the first oil pressure when the engine is automatically started upon detecting release of the brake pedal, it is determined by the accelerator pedal depression detecting device that the accelerator pedal of the hybrid vehicle is not depressed, and it is determined by the engine revolution rate measuring device that the engine revolution rate is equal to or less than an idling revolution rate.

According to the above apparatus for a hybrid vehicle, the oil pressure applied to the clutch of the stating gear is maintained to be the first oil pressure under the conditions in which the brake pedal is released while the engine is automatically stopped, the engine is thereby automatically started, the accelerator pedal of the hybrid vehicle is not depressed yet, and the engine revolution rate is equal to or less than the idling revolution rate. Therefore, the transmission torque in the transmission can be limited to a level less than a torque transmittable with the first oil pressure, and thus preparation is completed for smoothly transmitting torque in the subsequent state in which the engine revolution rate exceeds the idling revolution rate.

In the above apparatus for a hybrid vehicle, the control unit may be adapted to control the motor-driven oil pump and the hydraulic control circuit so that the oil pressure applied to the clutch is increased from the first oil pressure to a second oil pressure when it is determined by the engine revolution rate measuring device that the engine revolution rate exceeds the idling revolution rate.

According to the above apparatus for a hybrid vehicle, the transmission torque in the transmission can be increased from a torque transmittable with the first oil pressure to a torque transmittable with the second oil pressure when the engine revolution rate exceeds the idling revolution rate. Because the engine torque is stable in a state in which the engine revolution rate exceeds the idling revolution rate, the driving force of the vehicle can be maintained to be a level corresponding to the idling revolution rate until the accelerator pedal is depressed even if the transmission torque in the transmission is increased prior to the depression of the accelerator pedal from a torque transmittable with the first oil pressure to a torque transmittable with the second oil pressure. Moreover, preparation is completed for smoothly increasing the transmission torque in the transmission in accordance with increase in the engine torque which will be caused by the forthcoming depression of the accelerator pedal.

The present invention provides another hydraulic control apparatus for a hybrid vehicle including: an engine and a motor as power sources of the hybrid vehicle; a transmission which is provided for transmitting powers of the engine and the motor to output shafts of the hybrid vehicle, and which includes a torque converter, a starting gear, and a clutch that controls an engagement state of the starting gear by being supplied with oil pressure; a hydraulic control circuit associated with the transmission; a motor-driven oil pump for supplying oil pressure to the hydraulic control circuit and the clutch; an engine automatic stop and start device which is associated with the engine in order to stop and start the engine under predetermined conditions; a control unit which is operatively connected to the engine automatic stop and start device, the motor-driven oil pump, and the hydraulic control circuit; a brake pedal depression detecting device which is provided for detecting whether the brake pedal of the hybrid vehicle is depressed, and which is connected to the control unit; an accelerator pedal depression detecting device which is provided for detecting whether the accelerator pedal of the hybrid vehicle is depressed, and which is connected to the control unit; and an engine revolution rate measuring device which is provided for sensing revolution rate of the engine, and which is connected to the control unit, wherein the control unit is adapted to control the motor-driven oil pump and the hydraulic control circuit so that the oil pressure applied to the clutch is set to be a first oil pressure while the engine is automatically stopped, wherein the control unit is adapted to operate the engine automatic stop and start device so as to start the engine when it is determined by the brake pedal depression detecting device that the brake pedal is released while the engine is automatically stopped, and wherein the control unit is adapted to control the motor-driven oil pump and the hydraulic control circuit so that the oil pressure applied to the clutch is decreased from the first oil pressure when the engine is automatically started upon detecting release of the brake pedal, and it is determined by the accelerator pedal depression detecting device that the accelerator pedal of the hybrid vehicle is not depressed, and then to control the motor-driven oil pump and the hydraulic control circuit so that the oil pressure applied to the clutch is increased to a second oil pressure which is greater than the first oil pressure when it is determined by the engine revolution rate measuring device that the engine revolution rate exceeds a predetermined revolution rate or when it is determined that a predetermined time has passed since the engine was automatically started.

According to the above apparatus for a hybrid vehicle, when the brake pedal is released while the engine is automatically stopped, and the engine is thereby automatically started, the transmission torque in the transmission can be made less than a torque transmittable with the first oil pressure in a predetermined period (i.e., until the engine revolution rate exceeds a predetermined revolution rate, or a predetermined time has passed since the engine was automatically started) from immediately after the engine is started, and the transmission torque in the transmission can be increased from the decreased torque to a torque transmittable with the second oil pressure when the predetermined period has passed. Because the engine torque is stable in a state in which the predetermined period has passed, the driving force of the vehicle can be maintained to be a level corresponding to the idling revolution rate until the accelerator pedal is depressed even if the transmission torque in the transmission is increased prior to the depression of the accelerator pedal from a torque transmittable with the first oil pressure to a torque transmittable with the second oil pressure. Moreover, preparation is completed for smoothly increasing the transmission torque in the transmission in accordance with increase in the engine torque which will be caused by the forthcoming depression of the accelerator pedal.

The present invention provides another hydraulic control apparatus for a hybrid vehicle including: an engine and a motor as power sources of the hybrid vehicle; a transmission which is provided for transmitting powers of the engine and the motor to output shafts of the hybrid vehicle, and which includes a torque converter, a starting gear, and a clutch that controls an engagement state of the starting gear by being supplied with oil pressure; a hydraulic control circuit associated with the transmission; a motor-driven oil pump for supplying oil pressure to the hydraulic control circuit and the clutch; an engine automatic stop and start device which is associated with the engine in order to stop and start the engine under predetermined conditions; a control unit which is operatively connected to the engine automatic stop and start device, the motor-driven oil pump, and the hydraulic control circuit; a brake pedal depression detecting device which is provided for detecting whether the brake pedal of the hybrid vehicle is depressed, and which is connected to the control unit; and an accelerator pedal depression detecting device which is provided for detecting whether the accelerator pedal of the hybrid vehicle is depressed, and which is connected to the control unit, wherein the control unit is adapted to control the motor-driven oil pump and the hydraulic control circuit so that the oil pressure applied to the clutch is set to be a first oil pressure while the engine is automatically stopped, wherein the control unit is adapted to operate the engine automatic stop and start device so as to start the engine when it is determined by the brake pedal depression detecting device that the brake pedal is released while the engine is automatically stopped, and wherein the control unit is adapted to control the motor-driven oil pump and the hydraulic control circuit so that the oil pressure applied to the clutch is increased from the first oil pressure to a second oil pressure which is greater than the first oil pressure when the engine is automatically started upon detecting release of the brake pedal, and it is determined by the accelerator pedal depression detecting device that the accelerator pedal of the hybrid vehicle is depressed.

According to the above apparatus for a hybrid vehicle, when the brake pedal is released while the engine is automatically stopped, the engine is thereby automatically started, and the accelerator pedal is depressed, the transmission torque in the transmission can be increased from a torque transmittable with the first oil pressure to a torque transmittable with the second oil pressure regardless of the level of the engine revolution rate. Therefore, the transmission torque in the transmission can be smoothly increased without having a substantial slip in the clutch in accordance with increase in the engine torque which is caused by the subsequent depression of the accelerator pedal.

The present invention provides another hydraulic control apparatus for a hybrid vehicle including: an engine and a motor as power sources of the hybrid vehicle; a transmission which is provided for transmitting powers of the engine and the motor to output shafts of the hybrid vehicle, and which includes a torque converter, a starting gear, and a clutch that controls an engagement state of the starting gear by being supplied with oil pressure; a hydraulic control circuit associated with the transmission; a motor-driven oil pump for supplying oil pressure to the hydraulic control circuit and the clutch; an engine automatic stop and start device which is associated with the engine in order to stop and start the engine under predetermined conditions; a control unit which is operatively connected to the engine automatic stop and start device, the motor-driven oil pump, and the hydraulic control circuit; a brake pedal depression detecting device which is provided for detecting whether the brake pedal of the hybrid vehicle is depressed, and which is connected to the control unit; and an accelerator pedal depression detecting device which is provided for detecting whether the accelerator pedal of the hybrid vehicle is depressed, and which is connected to the control unit, wherein the control unit is adapted to control the motor-driven oil pump and the hydraulic control circuit so that the oil pressure applied to the clutch is set to be a first oil pressure during an idling stop operation of the engine, wherein the control unit is adapted to operate the engine automatic stop and start device so as to start the engine when it is determined by the brake pedal depression detecting device that the brake pedal is released while the engine is automatically stopped, and wherein the control unit is adapted to control the motor-driven oil pump and the hydraulic control circuit so that the oil pressure applied to the clutch is decreased from the first oil pressure when the engine is automatically started upon detecting release of the brake pedal, and it is determined by the accelerator pedal depression detecting device that the accelerator pedal of the hybrid vehicle is not depressed, and then to control the motor-driven oil pump and the hydraulic control circuit so that the oil pressure applied to the clutch is increased to a second oil pressure which is greater than the first oil pressure when it is determined by the accelerator pedal depression detecting device that the accelerator pedal of the hybrid vehicle is depressed.

According to the above apparatus for a hybrid vehicle, when the brake pedal is released while the engine is automatically stopped, the engine is thereby automatically started, and when the engine torque is unstable immediately after the engine is started, the transmission torque in the transmission can be made less than a torque transmittable with the first oil pressure, and then the transmission torque in the transmission can be increased to a torque transmittable with the second oil pressure when the accelerator pedal is depressed. Therefore, the transmission torque in the transmission can be smoothly increased without having a substantial slip in the clutch in accordance with increase in the engine torque which is caused by the subsequent depression of the accelerator pedal.

The present invention provides another hydraulic control apparatus for a hybrid vehicle including: an engine and a motor as power sources of the hybrid vehicle; a transmission which is provided for transmitting powers of the engine and the motor to output shafts of the hybrid vehicle, and which includes a torque converter, a starting gear, and a clutch that controls an engagement state of the starting gear by being supplied with oil pressure; a hydraulic control circuit associated with the transmission; a motor-driven oil pump for supplying oil pressure to the hydraulic control circuit and the clutch; an engine automatic stop and start device which is associated with the engine in order to stop and start the engine under predetermined conditions; a control unit which is operatively connected to the engine automatic stop and start device, the motor-driven oil pump, and the hydraulic control circuit; a brake pedal depression detecting device which is provided for detecting whether the brake pedal of the hybrid vehicle is depressed, and which is connected to the control unit; and an accelerator pedal depression detecting device which is provided for detecting whether the accelerator pedal of the hybrid vehicle is depressed, and which is connected to the control unit, wherein the control unit is adapted to control the motor-driven oil pump and the hydraulic control circuit so that the oil pressure applied to the clutch is set to be a first oil pressure while the engine is automatically stopped, and wherein the control unit is adapted to control the motor-driven oil pump and the hydraulic control circuit so that the oil pressure applied to the clutch is increased from the first oil pressure to a second oil pressure when it is determined by the brake pedal depression detecting device that the brake pedal is depressed, and it is determined by the accelerator pedal depression detecting device that the accelerator pedal of the hybrid vehicle is depressed while the engine is automatically stopped.

According to the above apparatus for a hybrid vehicle, when the brake pedal is depressed while the engine is automatically stopped, and the engine is automatically started upon depression of the accelerator pedal, the transmission torque in the transmission can be increased from a torque transmittable with the first oil pressure to a torque transmittable with the second oil pressure regardless of the level of the engine revolution rate. Therefore, the transmission torque in the transmission can be smoothly increased without having a substantial slip in the clutch in accordance with increase in the engine torque which is caused by the depression of the accelerator pedal.

The present invention provides another hydraulic control apparatus for a hybrid vehicle including: an engine and a motor as power sources of the hybrid vehicle; a transmission which is provided for transmitting powers of the engine and the motor to output shafts of the hybrid vehicle, and which includes a torque converter, a starting gear, and a clutch that controls an engagement state of the starting gear by being supplied with oil pressure; a hydraulic control circuit associated with the transmission; a motor-driven oil pump for supplying oil pressure to the hydraulic control circuit and the clutch; an engine automatic stop and start device which is associated with the engine in order to stop and start the engine under predetermined conditions; a control unit which is operatively connected to the engine automatic stop and start device, the motor-driven oil pump, and the hydraulic control circuit; a brake pedal depression detecting device which is provided for detecting whether the brake pedal of the hybrid vehicle is depressed, and which is connected to the control unit; an accelerator pedal depression detecting device which is provided for detecting whether the accelerator pedal of the hybrid vehicle is depressed, and which is connected to the control unit; and an engine revolution rate measuring device which is provided for sensing revolution rate of the engine, and which is connected to the control unit, wherein the control unit is adapted to control the motor-driven oil pump and the hydraulic control circuit so that the oil pressure applied to the clutch is set to be a first oil pressure while the engine is automatically stopped, wherein the control unit is adapted to operate the engine automatic stop and start device so as to start the engine when predetermined conditions for starting the engine, regardless of the driver's intention to move the vehicle, are fulfilled while the engine is automatically stopped, wherein the control unit is adapted to control the motor-driven oil pump and the hydraulic control circuit so that the oil pressure applied to the clutch is decreased from the first oil pressure to a lower limit oil pressure when the engine is automatically started upon detecting a disturbance, it is determined by the brake pedal depression detecting device that the brake pedal is depressed, and it is determined by the accelerator pedal depression detecting device that the accelerator pedal of the hybrid vehicle is not depressed, and wherein the control unit is adapted to control the motor-driven oil pump and the hydraulic control circuit so that the oil pressure applied to the clutch is increased from the lower limit oil pressure to a second oil pressure which is greater than the first oil pressure when it is determined by the engine revolution rate measuring device that the engine revolution rate exceeds the idling revolution rate.

According to the above apparatus for a hybrid vehicle, when the brake pedal is depressed and the accelerator pedal is not depressed while the engine is automatically stopped, and the engine is automatically started not upon the driver's intention to move the vehicle, but upon detecting a disturbance, the transmission torque in the transmission can be decreased from a torque transmittable with the first oil pressure to a torque transmittable with the lower limit oil pressure, and thereby the transmission torque in the transmission can be limited to a level that is less than a torque transmittable with the lower limit oil pressure until the engine revolution rate reaches the idling revolution rate. Moreover, when the engine revolution rate exceeds the idling revolution rate, the transmission torque in the transmission can be increased from a torque transmittable with the lower limit oil pressure to a torque transmittable with the second oil pressure. Note that the lower limit oil pressure may be set to be zero, or may be set to be a predetermined oil pressure (not zero) that is considerably less than the first oil pressure.

In the above apparatus for a hybrid vehicle, the lower limit oil pressure may be set to be substantially zero.

In the above apparatus for a hybrid vehicle, the predetermined conditions for starting the engine, regardless of the driver's intention to move the vehicle, include at least one of the case in which a request is made by an air conditioning system of the hybrid vehicle to operate an engine-driven compressor, and the case in which a request is made to charge a battery, which is provided for operating the motor, because the state of charge of the battery is low.

According to the above apparatus for a hybrid vehicle, when the brake pedal is depressed and the accelerator pedal is not depressed while the engine is automatically stopped, and the engine is automatically started not upon the driver's intention to move the vehicle, but upon detecting a disturbance, i.e., when predetermined conditions for starting the engine, regardless of the driver's intention to move the vehicle, are fulfilled, the transmission torque in the transmission can be decreased to be substantially zero.

In the above apparatus for a hybrid vehicle, the first oil pressure may be set to be an oil pressure which is required for transmitting a creeping torque.

According to the above apparatus for a hybrid vehicle, when the oil pressure applied to the clutch is controlled to be the first oil pressure, the creeping torque can be applied to the vehicle.

In the above apparatus for a hybrid vehicle, the second oil pressure may be set to be an oil pressure which is required for transmitting a maximum torque of the engine.

According to the above apparatus for a hybrid vehicle, when the oil pressure applied to the clutch is controlled to be the second oil pressure, the maximum torque of the engine can be applied to the vehicle.

The hydraulic control apparatus for a hybrid vehicle may further include a mechanical oil pump which is driven by at least one of the engine and the motor, and which supplies oil pressure to the hydraulic control circuit and the clutch, and the control unit may be adapted to operate the motor-driven oil pump when the engine is automatically stopped.

According to the above apparatus for a hybrid vehicle, the hybrid vehicle has at least one of the mechanical oil pump and the motor-driven oil pump, and the oil pressure applied to the clutch can be controlled in such manners as described above when at least one of the mechanical oil pump and the motor-driven oil pump is operated.

DESCRIPTION OF THE PREFERRED EMBODIMENTS

An embodiment of the hydraulic control device for a hybrid vehicle according to the present invention will be explained below with reference to FIGS. 1 to 11.

Figure 1:
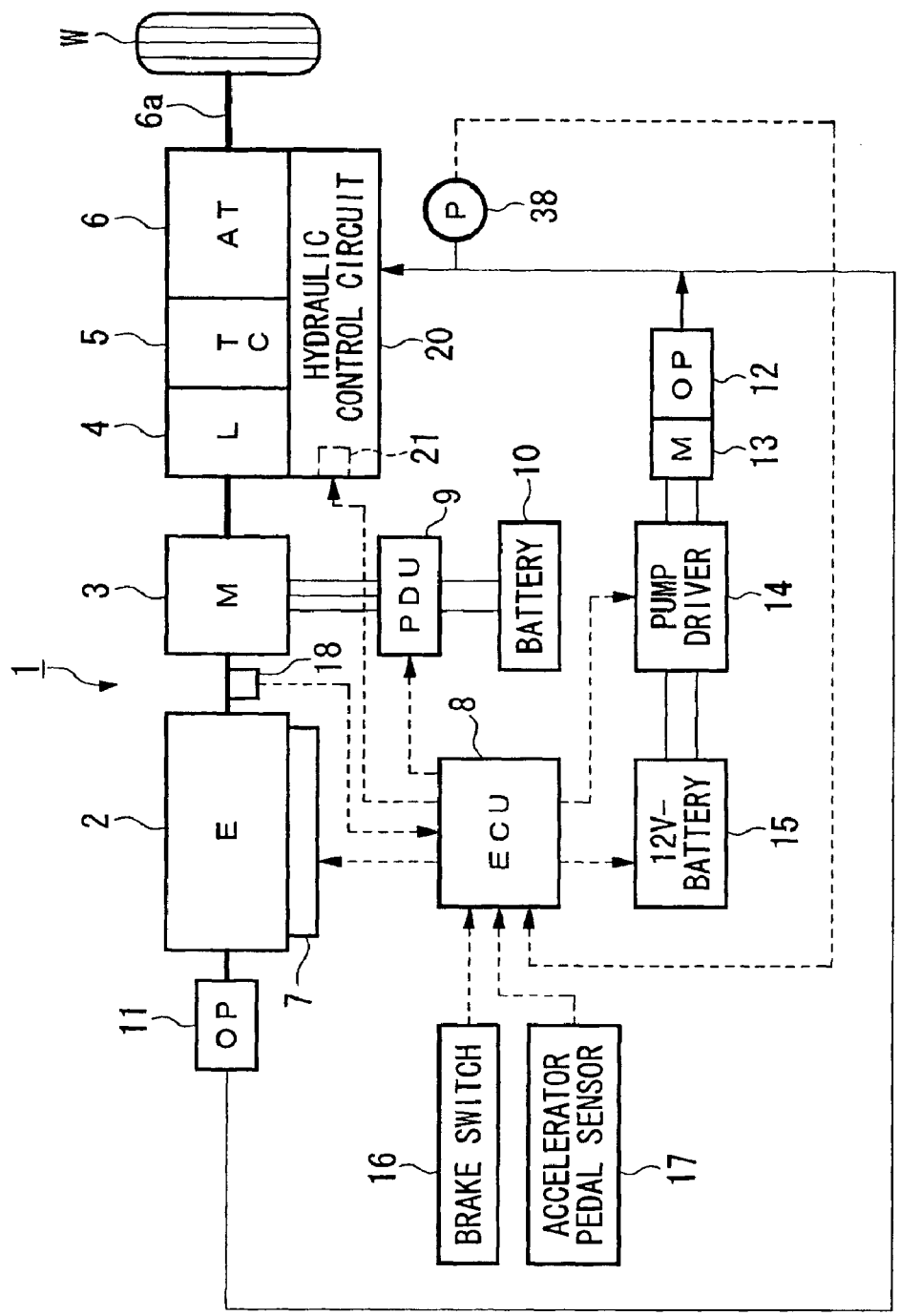
FIG. 1 is a schematic diagram showing the general structure of an embodiment of a hybrid vehicle having a hydraulic control device according to the present invention.

FIG. 1 is a schematic diagram showing a power transmission system of a hybrid vehicle 1 having the hydraulic control device according to the present invention.

In the hybrid vehicle 1, an engine 2 and a motor 3 (hereinafter referred to as a motor-generator) which is capable of generating electrical power are directly connected to each other, and at least one of the powers of the engine 2 and the motor-generator 3 is transmitted to output shafts 6a via a torque converter 4 having a lockup clutch 4 and via a multi-geared automatic transmission 6, and is further transmitted to driving wheels W via a differential gear mechanism (not shown) and the like.

The engine 2 is a multi-cylinder reciprocating engine, and is equipped with a fuel injection and ignition control device 7 which performs fuel injection controls for the cylinders and ignition controls for the injected fuel. In this embodiment, an electronically controlled throttle system (a so-called drive-by-wire system that is simply referred to as a DBW system) is employed, and the operation of a throttle valve (not shown) of the engine 2 is electronically controlled by an ECU 8 depending on a depression amount of the accelerator pedal.

Moreover, the operation of the fuel injection and ignition control device 7 is controlled by the ECU 8. An automatic stop and start control operation (a so-called idling stop control operation) is executed on the engine 2 under predetermined conditions by the fuel injection and ignition control device 7 and the ECU 8. To this end, output signals from various sensors are input into the ECU 8, such as a brake switch 16 (a brake pedal depression detecting device) which is provided for detecting whether the brake pedal is depressed, an accelerator pedal sensor 17 (an accelerator pedal depression detecting device) which is provided for detecting whether the accelerator pedal is depressed, an engine revolution rate sensor 18 (an engine revolution rate measuring device) which is provided for sensing the revolution rate of the engine 2, a vehicle speed sensor (not shown) which is provided for sensing the vehicle speed, a shift position sensor (not shown) which is provided for sensing the shift position of the transmission 6, and a state of charge sensor which is provided for sensing a state of charge of a battery 10 (which will be explained later).

In this embodiment, the accelerator pedal sensor 17 acts as the accelerator pedal depression detecting device which detects whether or not the accelerator pedal is depressed, i.e., when the sensed depression amount is zero, it is determined that the accelerator pedal is not depressed, and when the sensed depression amount is greater than zero, it is determined that the accelerator pedal is depressed.

Moreover, the fuel injection and ignition control device 7 and the ECU 8 constitute an engine automatic stop and start device.

The torque converter 5 transmits torque from the output shaft of the motor-generator 3 to the input shaft of the transmission 6 using fluid when the lockup clutch 4 is disengaged, and when the lockup clutch 4 is engaged, the output shaft of the motor-generator 3 is substantially directly connected to the input shaft of the transmission 6 so that torque is directly transmitted from the output shaft of the motor-generator 3 to the input shaft of the transmission 6 without intervening fluid. The engagement and disengagement of the lockup clutch 4 and the gear change operation in the transmission 6 are hydraulically controlled by a hydraulic control circuit 20 depending on the operation state of the vehicle.

When the hybrid vehicle 1 decelerates, and driving force is transmitted from the driving wheels to the motor-generator 3, the motor-generator 3 acts as a generator and generates a so-called regenerative braking force so that the kinetic energy of the hybrid vehicle 1 is recovered as electrical energy which is stored in a battery 10 via a power drive unit (PDU) 9. In this case, the regenerated power is controlled by the ECU 8 via the PDU 9.

The motor-generator 3 is operated by using the electrical energy stored in the battery 10, and is controlled by the ECU 8 via the PDU 9. The battery 10 may be substituted by a capacitor.

The hybrid vehicle 1 has, as hydraulic power sources for the hydraulic control circuit 20, a mechanical oil pump 11 and a motor-driven oil pump 12 whose capacity is less than that of the mechanical oil pump 11. The mechanical oil pump 11 is connected to the output shaft of the engine 2, and is operated by the driving power of the engine 2 or the motor-generator 3.

On the other hand, the motor-driven oil pump 12 is operated by an electrical motor (a drive motor) 13 to which electrical power of a 12-volt battery 15 is supplied via a pump driver (a motor ECU) 14. Basically, the motor-driven oil pump 12 is controlled so as to operate when the engine 2 and the motor-generator 3 are stopped, i.e., when the mechanical oil pump 11 cannot be operated. More specifically, the pump driver 14 makes the electrical motor 13 start in order to operate the motor-driven oil pump 12 when stop conditions for the engine 2 are fulfilled and the revolution rate of the engine 2 is reduced to a level that is less than a predetermined revolution rate, and then the pump driver 14 makes the electrical motor 13 stop under predetermined conditions. The stop operation of the engine 2 is permitted when, for example, the vehicle speed is equal to or less than a predetermined speed (e.g., 10 km/h) or the engine revolution rate is equal to or less than a predetermined revolution rate, the depression amount of the accelerator pedal is "0", the brake switch is in the "ON" state, and the state of charge of the battery 10 is equal to or greater than a predetermined value, and in addition, the shift position of the transmission 6, the hydraulic control state of the transmission 6, and the like fulfill predetermined conditions. The motor-driven oil pump 12 is stopped when the engine 2 is started, thereby the mechanical oil pump 11 generates operational pressure, and then the oil line pressure becomes equal to or greater than a threshold.

Figure 2:
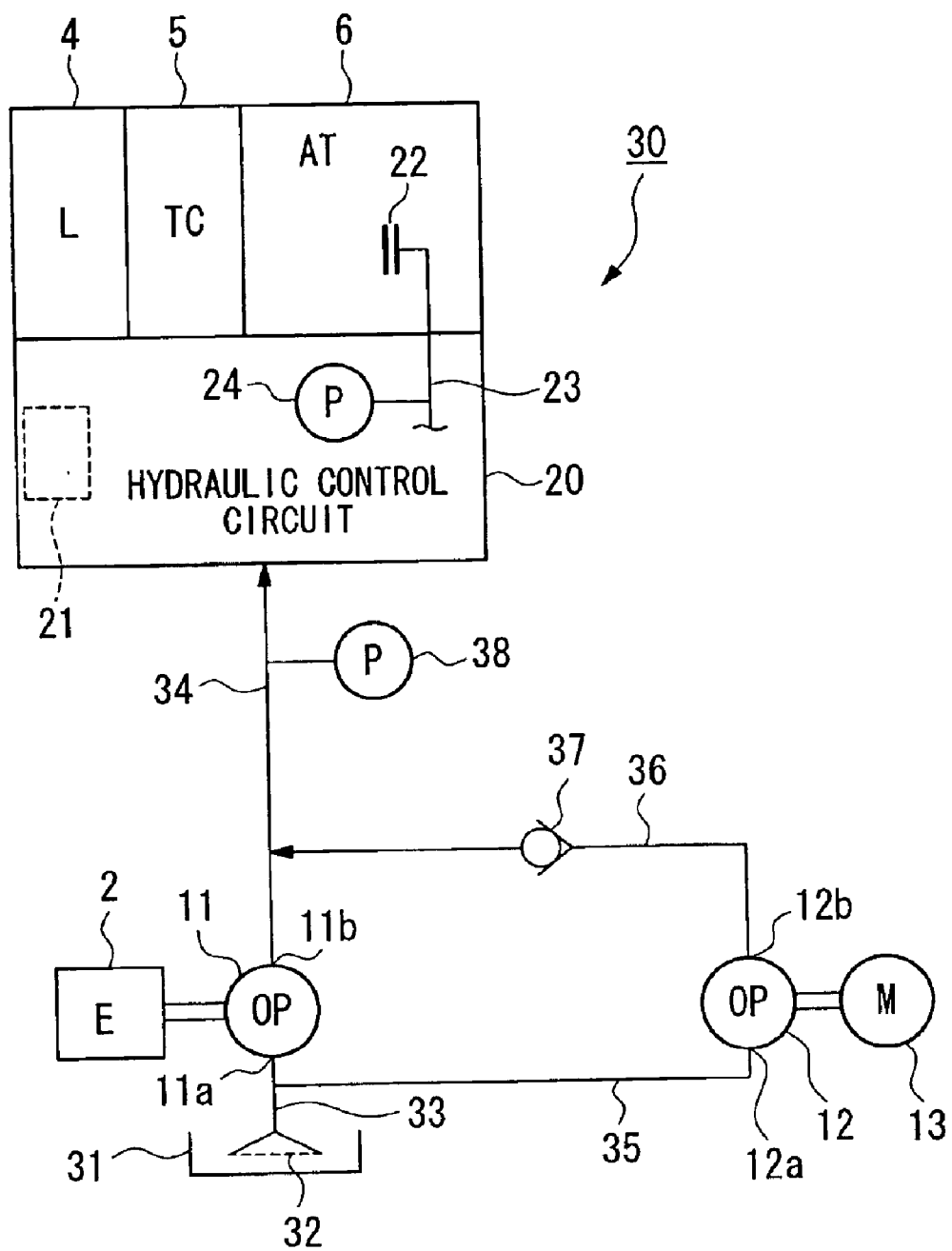
FIG. 2 is a hydraulic circuit diagram of an automatic transmission included in the above embodiment.

Next, a hydraulic circuit (a hydraulic pressure supply device) 30 which supplies hydraulic pressure to the transmission 6 will be explained with reference to FIG. 2. The mechanical oil pump 11 has a suction port 11a and a discharge port 11*b*. The suction port 11*a* is connected to a strainer 32 that is disposed in an oil pan 31 via a suction pipe 33. The discharge port 11*b* is connected to the hydraulic control circuit 20 via a discharge pipe 34.

The motor-driven oil pump 12 has a suction port 12*a* and a discharge port 12*b*. The suction port 12*a* is connected to the suction pipe 33 via a suction pipe 35. The discharge port 12*b* is connected to the discharge pipe 34 via a discharge pipe 36. The discharge pipe 36 is provided with a check valve 37 that allows hydraulic fluid to flow from the discharge port 12*b* of the motor-driven oil pump 12 to the discharge pipe 34 and prohibits the flow of the hydraulic fluid from the discharge pipe 34 to the discharge port 12*b*.

As is conventionally known, the hydraulic control circuit 20 includes manual valves (not shown) which are operated in interlock with the shift lever provided near the driver's seat, and thereby distribute the hydraulic fluid supplied from the discharge pipe 34 to basic hydraulic passages provided for forward movement, neutral, and reverse movement, shift valves which control the hydraulic passages and hydraulic pressure of the hydraulic fluid supplied from the discharge pipe 34, and solenoid valve groups 21 which control pilot pressures of the shift valves. Having the above components, the hydraulic control circuit 20 automatically and optimally controls gear positions of the transmission 6 by controlling the operations of clutches and brakes (none of them is shown) in the transmission 6 through controlling of the hydraulic passages and hydraulic pressure using the shift valves and depending on the operation state of the vehicle.

In the hybrid vehicle 1, the shift valves are controlled so as to engage the clutch for the starting gear (i.e., first or second gear) of the transmission 6 when the vehicle starts running. In FIG. 2, only the clutch 22 for the starting gear and a portion of a hydraulic passage 23 through which hydraulic pressure is applied to the clutch 22 are shown, and other clutches and brakes for other gears and other hydraulic passages are not shown. The hydraulic passage 23 is provided with an oil pressure sensor 24 for measuring oil pressure applied to clutch 22. In the following description, a clutch oil pressure of the starting gear indicates the oil pressure that is applied to the clutch 22.

Moreover, a portion of the discharge pipe 34, which is located downstream of a merging point with the discharge pipe 36, is provided with an oil pressure sensor 38 for measuring oil pressure (i.e., oil line pressure) of the hydraulic fluid flowing through the discharge pipe 34. Because the oil pressure sensor 38 is disposed downstream of the merging point as mentioned above, the oil pressure sensor 38 can measure the oil line pressure of the hydraulic circuit 30 either when the pressurized fluid is supplied from the mechanical oil pump 11 to the transmission 6, and when the pressurized fluid is supplied from the motor-driven oil pump 12 to the transmission 6. The output signals of the oil pressure sensors 24 and 38 are input to the ECU 8.

Next, a hydraulic control operation in the hydraulic circuit 30 when the engine 2 is automatically started after the engine 2 is automatically stopped will be explained.

Basically, in the hybrid vehicle 1, when the engine 2 runs, the mechanical oil pump 11 is operated so as to supply the pressurized fluid to the discharge 34 so that the oil line pressure is maintained to be a normal oil pressure (a second oil pressure), and when the engine 2 is stopped, because the mechanical oil pump 11 cannot be operated, the motor-driven oil pump 12 is operated so as to supply the pressurized fluid to the discharge 34 so that the oil line pressure is maintained to be a first oil pressure that is less than the normal pressure. In this embodiment, the first oil pressure is set to be an oil pressure which is required for the clutch 22 to transmit a creeping torque (an oil pressure corresponding to a creeping torque, this is hereinafter simply referred to as a "creep oil pressure"), and the normal oil pressure is set to be an oil pressure which is required for the clutch 22 to transmit the maximum torque of the engine 2.

By having both the mechanical oil pump 11 and the motor-driven oil pump 12, and by optionally using one of them depending on the circumstances, the motor-driven oil pump 12 may be a compact one, and electrical power consumption may be reduced when compared to the case in which the motor-driven oil pump 12 is solely used to apply oil pressure in all cases.

There are two major cases in which the engine 2 is automatically started after being automatically stopped. One is the case in which an engine start request command comes into effect due to the driver's intention to move the vehicle, and the other is the case in which an engine start request command comes into effect due to a disturbance, i.e., predetermined conditions for starting the engine, regardless of the driver's intention to move the vehicle, are fulfilled while the engine is automatically stopped. More specifically, the predetermined conditions include, for example, the case in which a request is made by the air conditioning system of the vehicle to operate an air conditioning compressor which is driven by the engine 2 via a belt, the case in which a request is made by the ECU 8 to charge the battery 10 because the state of charge of the battery 10 is low, etc.

In the hybrid vehicle 1, the oil line pressure and the clutch oil pressure for the starting gear in the transmission 6 are precisely controlled in either cases mentioned above in which the engine 2 is automatically started in order to transmit torque in such a manner that the driver does not have a sense of incongruity, and in order not to have unexpected behavior of the vehicle.

FIGS. 3 to 8 are time-domain charts respectively showing changes in the engine revolution rate NE, the oil line pressure, and the clutch oil pressure over a period in which the engine 2 runs normally (a normal running state), then the engine is placed in an automatically stopped state (in an idling stop state), and then the engine 2 is automatically started. In these patterns shown in FIGS. 3 to 8, the transitional processes from the normal running state to the automatically stopped state are the same as each other. More specifically, when engine stop conditions (a condition in which the brake switch is in the "ON" state is included) are fulfilled during the normal running state of the engine 2, an operation for stopping the engine is enforced, and the engine revolution rate is decreased to a level that is less than a predetermined revolution rate during the operation for stopping the engine, the motor-driven oil pump 12 is operated. When the engine revolution rate is maintained to be "0", i.e., the engine 2 is placed in the idling stop state, the oil line pressure is controlled by the motor-driven oil pump 12 so as to be the first oil pressure that is the creep oil pressure, and the clutch oil pressure is also controlled so as to be the creep oil pressure.

In FIGS. 3 to 8, the period indicated by "BRAKE OFF (i.e., the brake pedal is released)" is a period in which the engine 2 runs normally, the period from the beginning of "BRAKE ON (i.e., the brake pedal is depressed)" to "ENGINE STOP" is a period in which the operation for stopping the engine is executed, and the period from "ENGINE STOP" to "ENGINE START" corresponds to the idling stop state.

In the patterns shown in FIGS. 3 to 8, the conditions for automatically starting the engine are set differently from each other. The respective patterns along with the conditions for automatically starting the engine will be explained below.

Figure 3:
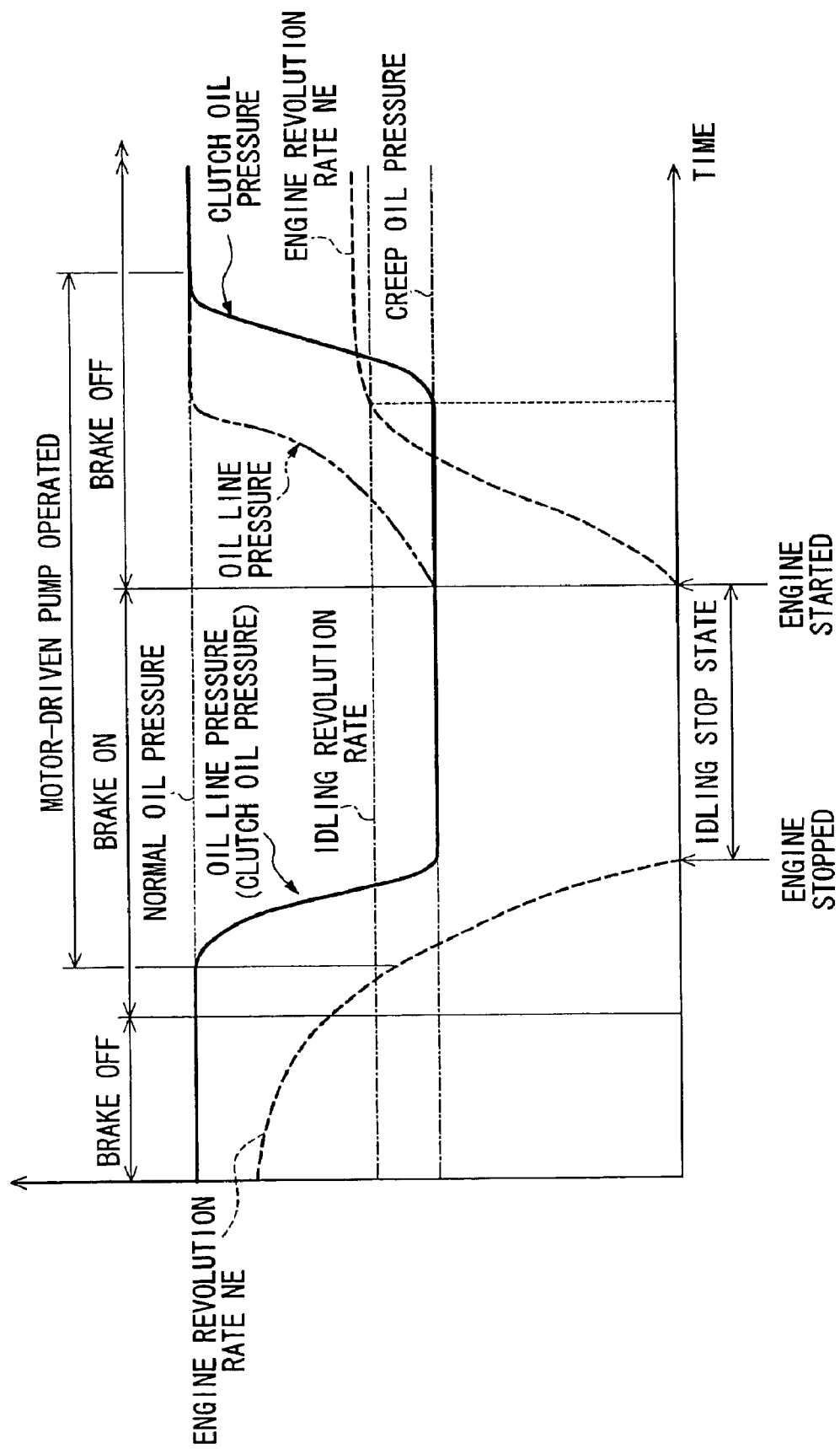
FIG. 3 is a time-domain chart (a first control pattern) showing changes in an oil line pressure and a clutch oil pressure that is applied to a clutch in the transmission when the engine is automatically started in the above embodiment.
Figure 4:
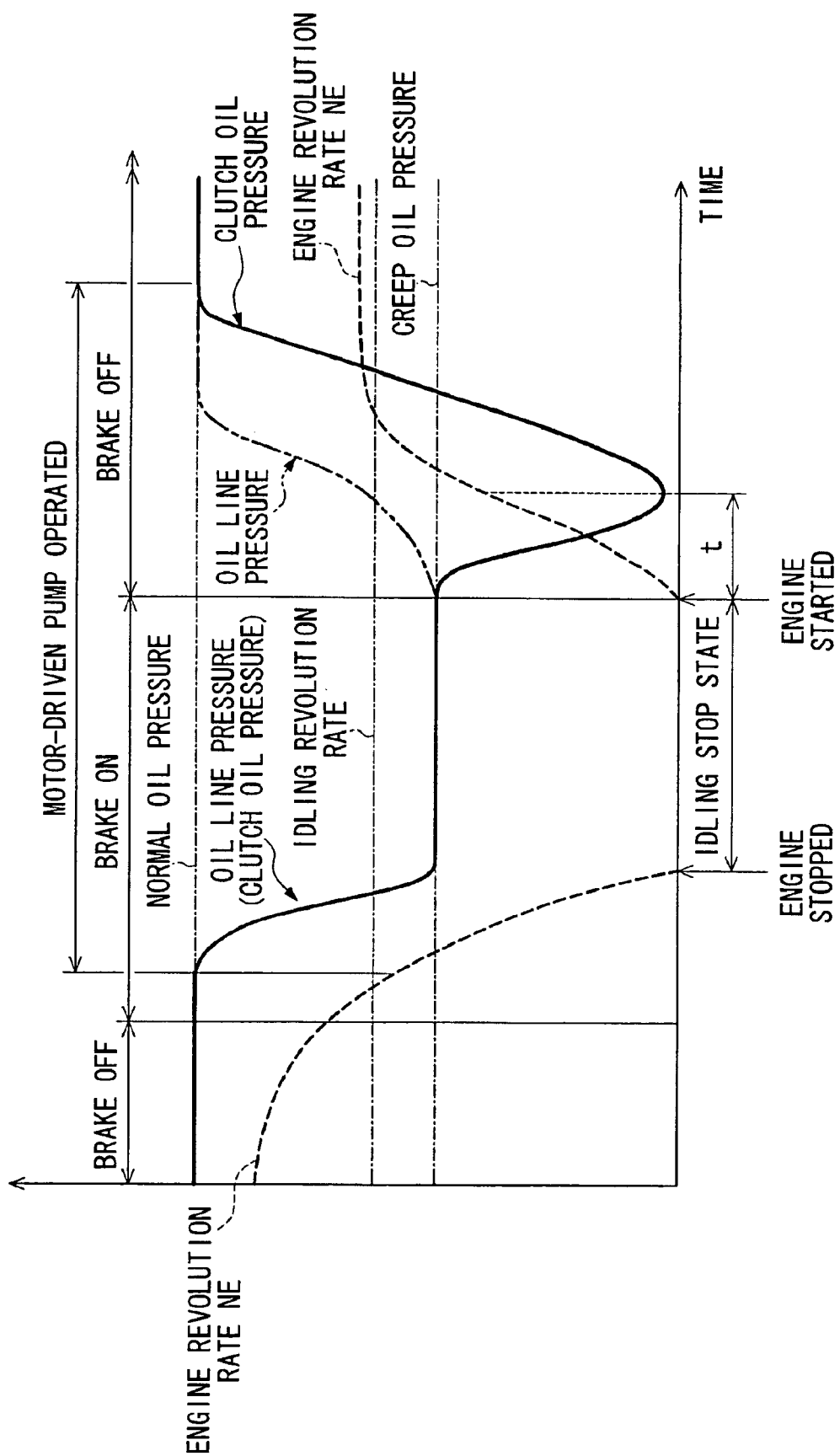
FIG. 4 is a time-domain chart (a second control pattern) showing changes in the oil line pressure and the clutch oil pressure when the engine is automatically started in the above embodiment.
Figure 5:
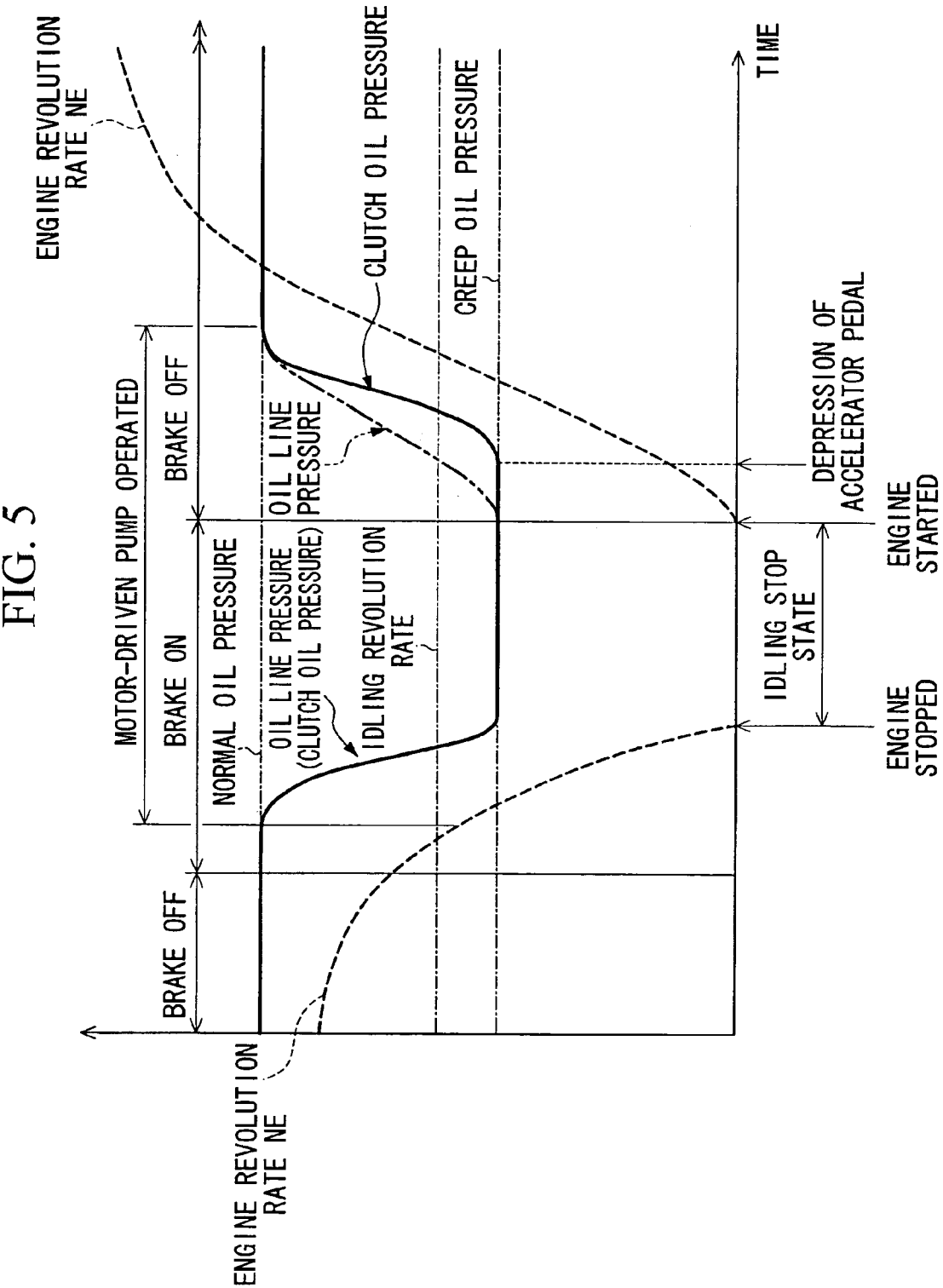
FIG. 5 is a time-domain chart (a third control pattern) showing changes in the oil line pressure and the clutch oil pressure when the engine is automatically started in the above embodiment.
Figure 6:
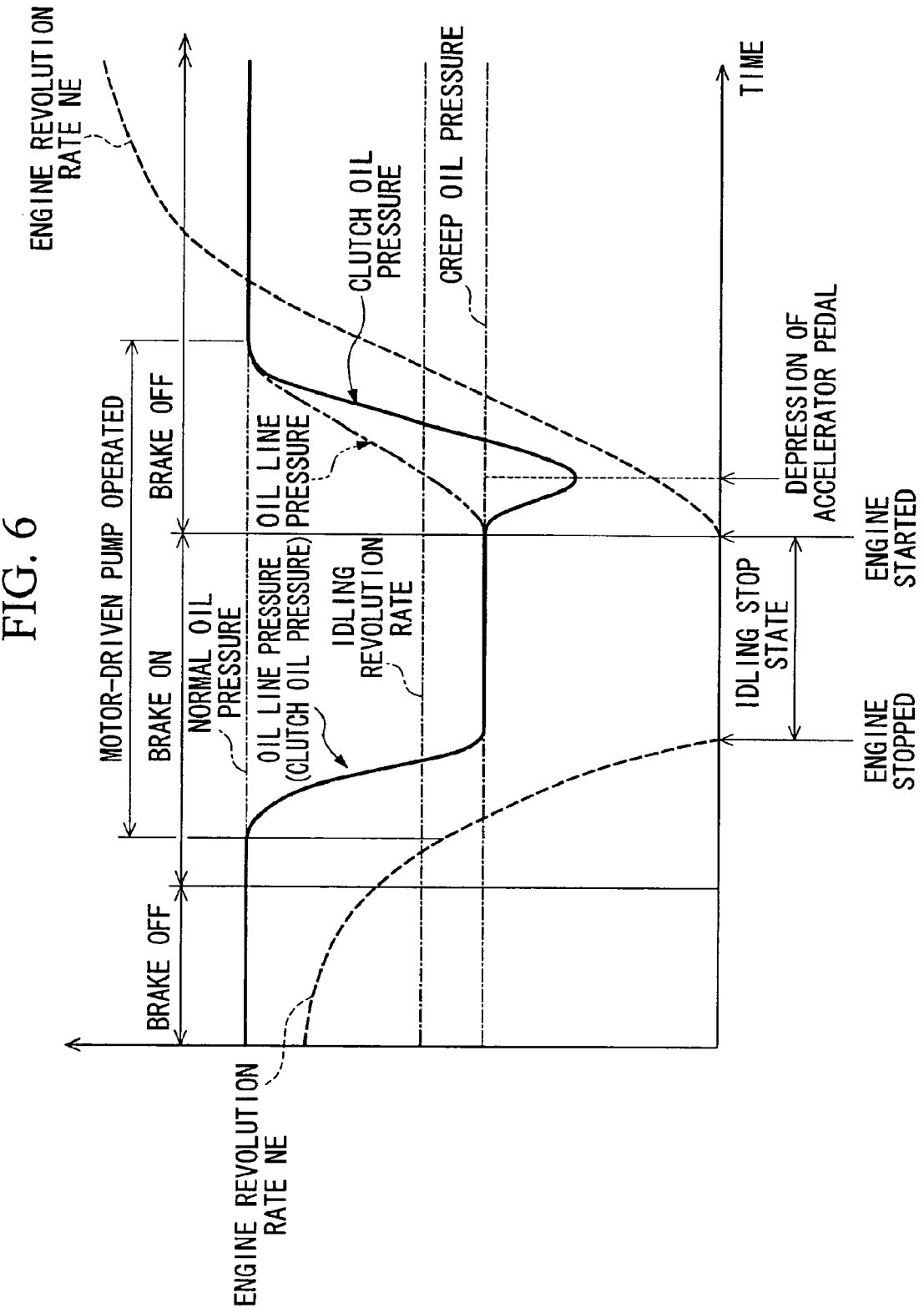
FIG. 6 is a time-domain chart (a fourth control pattern) showing changes in the oil line pressure and the clutch oil pressure when the engine is automatically started in the above embodiment.

Exemplary Situations in each of which the Brake Pedal is Released during the Idling Stop State FIGS. 3 to 6 show control patterns in each of which the engine is automatically started due to release of the brake pedal during the idling stop state. More specifically, FIGS. 3 and 4 show the situations in each of which the accelerator pedal is not depressed after the engine is automatically started, and FIGS. 5 and 6 show the cases in each of which the accelerator pedal is depressed after the engine is automatically started.

The chart shown in FIG. 3 will be explained. When it is determined by the brake switch 16 that the brake pedal is released during the idling stop state, an automatic starting operation for the engine 2 by the motor-generator 3 begins. The mechanical oil pump 11 is operated upon starting of the engine 2, and the oil line pressure is controlled so as to gradually increase to the normal oil pressure in accordance with increase in the engine revolution rate. On the other hand, the clutch oil pressure of the starting gear in the transmission 6 is controlled so as to be maintained to be the creep oil pressure, as in the idling stop state, when it is determined by the accelerator pedal sensor 17 that the accelerator pedal is not depressed, and it is determined by the engine revolution rate sensor 18 that the engine revolution rate is equal to or less than the idling revolution rate. As a result, because the transmission torque in the transmission 6 is limited to a level that is less than the creeping torque when the engine revolution rate is less than the idling revolution rate, i.e., when the engine torque is unstable, the vehicle is prevented from being provided with an excessive driving force, and the stop state of the vehicle can be reliably maintained. In addition, preparation is completed for smoothly transmitting torque in the subsequent state in which the engine revolution rate exceeds the idling revolution rate.

When the engine revolution rate increases and exceeds the idling revolution rate, the clutch oil pressure of the starting gear in the transmission 6 is controlled so as to gradually increase from the creep oil pressure to the normal oil pressure. Before the accelerator pedal is depressed, the engine 2 is placed in the idling state in which the engine revolution rate is maintained to be a predetermined revolution rate that is slightly greater than the idling revolution rate, and in which the clutch oil pressure is maintained to be the normal oil pressure. As a result, the transmitting torque in the transmission 6 can be gradually increased from the creeping torque to the maximum torque of the engine 2.

Because the engine torque is stable in a state in which the engine revolution rate exceeds the idling revolution rate, the driving force of the vehicle can be maintained to be a level corresponding to the creeping torque until the accelerator pedal is depressed even if the transmission torque in the transmission 6 is increased prior to the depression of the accelerator pedal from the creeping torque to the maximum torque of the engine 2. Moreover, preparation is completed for smoothly increasing the transmission torque in the transmission in accordance with increase in the engine torque which will be caused by the forthcoming depression of the accelerator pedal due to the driver's intention to move the vehicle.

Accordingly, when the accelerator pedal is subsequently depressed, the transmission torque in the transmission 6 can be smoothly increased without having a substantial slip in the clutch 22 of the starting gear in accordance with increase in the engine torque after the accelerator pedal is depressed. As a result, the length of the service life of the clutch 22 may be enhanced, a comfortable starting performance without jolting of the vehicle may be obtained, and the drivability of the vehicle may be improved.

In the case shown in FIG. 3, the clutch oil pressure of the starting gear in the transmission 6 is controlled so as to be maintained to be the creep oil pressure when it is determined by the accelerator pedal sensor 17 that the accelerator pedal is not depressed, and it is determined by the engine revolution rate sensor 18 that the engine revolution rate is equal to or less than the idling revolution rate; however, the clutch oil pressure may be maintained to be a value which is less than the creep oil pressure in order to further ensure the stop state of the vehicle.

Next, the chart shown in FIG. 4 will be explained. When it is determined by the brake switch 16 that the brake pedal is released during the idling stop state, an automatic starting operation for the engine 2 by the motor-generator 3 begins. The mechanical oil pump 11 is operated upon starting of the engine 2, and the oil line pressure is controlled so as to gradually increase to the normal oil pressure in accordance with increase in the engine revolution rate. On the other hand, the clutch oil pressure of the starting gear in the transmission 6 is controlled so as to be decreased toward substantially zero (a lower limit oil pressure), when it is determined by the accelerator pedal sensor 17 that the accelerator pedal is not depressed. As a result, because the transmission torque in the transmission 6 is limited to a level that is less than the creeping torque immediately after the engine 2 is started, i.e., when the engine torque is unstable, the output shaft of the vehicle is reliably prevented from being provided with an unexpected torque, and the stop state of the vehicle can be reliably maintained.

Subsequently, after a predetermined time "t" has passed since the engine 2 was automatically started, or when it is determined by the engine revolution rate sensor 18 that the engine revolution rate exceeds the idling revolution rate, because the engine torque become stable, the clutch oil pressure is controlled so as to gradually increase from the above-mentioned decreased value to the normal oil pressure prior to the depression of the accelerator pedal. As a result, the transmission torque in the transmission 6 can be gradually increased to the maximum torque of the engine 2. During this control operation, the engine revolution rate is maintained to be a predetermined revolution rate that is slightly greater than the idling revolution rate, and the clutch oil pressure is maintained to be the normal oil pressure in the idling state as well.

As a result, the driving force of the vehicle can be maintained to be a level that is less than the creeping torque until the accelerator pedal is depressed. Moreover, preparation is completed for smoothly increasing the transmission torque in the transmission in accordance with increase in the engine torque which will be caused by the forthcoming depression of the accelerator pedal due to the driver's intention to move the vehicle.

Accordingly, when the accelerator pedal is subsequently depressed, the transmission torque in the transmission 6 can be smoothly increased without having a substantial slip in the clutch 22 of the starting gear in accordance with increase in the engine torque after the accelerator pedal is depressed. As a result, the length of the service life of the clutch 22 may be enhanced, a comfortable starting performance without jolting of the vehicle may be obtained, and the drivability of the vehicle may be improved.

Next, the charts shown in FIGS. 5 and 6 will be explained. The control patterns shown in FIGS. 5 and 6 are the cases in each of which the engine 2 is automatically started due to the driver's intention to move the vehicle.

First, the chart shown in FIG. 5 will be explained. When it is determined by the brake switch 16 that the brake pedal is released during the idling stop state, an automatic starting operation for the engine 2 by the motor-generator 3 begins. The mechanical oil pump 11 is operated upon starting of the engine 2, and the oil line pressure is controlled so as to gradually increase to the normal oil pressure in accordance with increase in the engine revolution rate. On the other hand, the clutch oil pressure of the starting gear in the transmission 6 is controlled so as to gradually increase from the creep oil pressure to the normal oil pressure when it is determined by the accelerator pedal sensor 17 that the accelerator pedal is depressed before the engine revolution rate reaches the idling revolution rate. Accordingly, because the transmission torque in the transmission 6 can be increased to the maximum torque of the engine 2, the transmission torque in the transmission 6 can be smoothly increased without having a substantial slip in the clutch 22 of the starting gear in accordance with increase in the engine torque after the accelerator pedal is depressed. As a result, the length of the service life of the clutch 22 may be enhanced, a comfortable starting performance without jolting of the vehicle may be obtained, and the drivability of the vehicle may be improved.

Next, the chart shown in FIG. 6 will be explained. When it is determined by the brake switch 16 that the brake pedal is released during the idling stop state, an automatic starting operation for the engine 2 by the motor-generator 3 begins. The mechanical oil pump 11 is operated upon starting of the engine 2, and the oil line pressure is controlled so as to gradually increase to the normal oil pressure in accordance with increase in the engine revolution rate. On the other hand, the clutch oil pressure of the starting gear in the transmission 6 is controlled so as to be decreased toward substantially zero (a lower limit oil pressure), when it is determined by the accelerator pedal sensor 17 that the accelerator pedal is not depressed. As a result, because the transmission torque in the transmission 6 is limited to a level that is less than the creeping torque immediately after the engine 2 is started, i.e., when the engine torque is unstable, the output shaft of the vehicle is reliably prevented from being provided with an unexpected torque, and unexpected behavior of the vehicle can be reliably prevented.

Subsequently, the clutch oil pressure is controlled so as to gradually increase from the above-mentioned decreased value to the normal oil pressure when it is determined by the accelerator pedal sensor 17 that the accelerator pedal is depressed. Accordingly, because the transmission torque in the transmission 6 can be increased to the maximum torque of the engine 2, the transmission torque in the transmission 6 can be smoothly increased without having a substantial slip in the clutch 22 of the starting gear in accordance with increase in the engine torque after the accelerator pedal is depressed. As a result, the length of the service life of the clutch 22 may be enhanced, a comfortable starting performance without jolting of the vehicle may be obtained, and the drivability of the vehicle may be improved.

Figure 7:
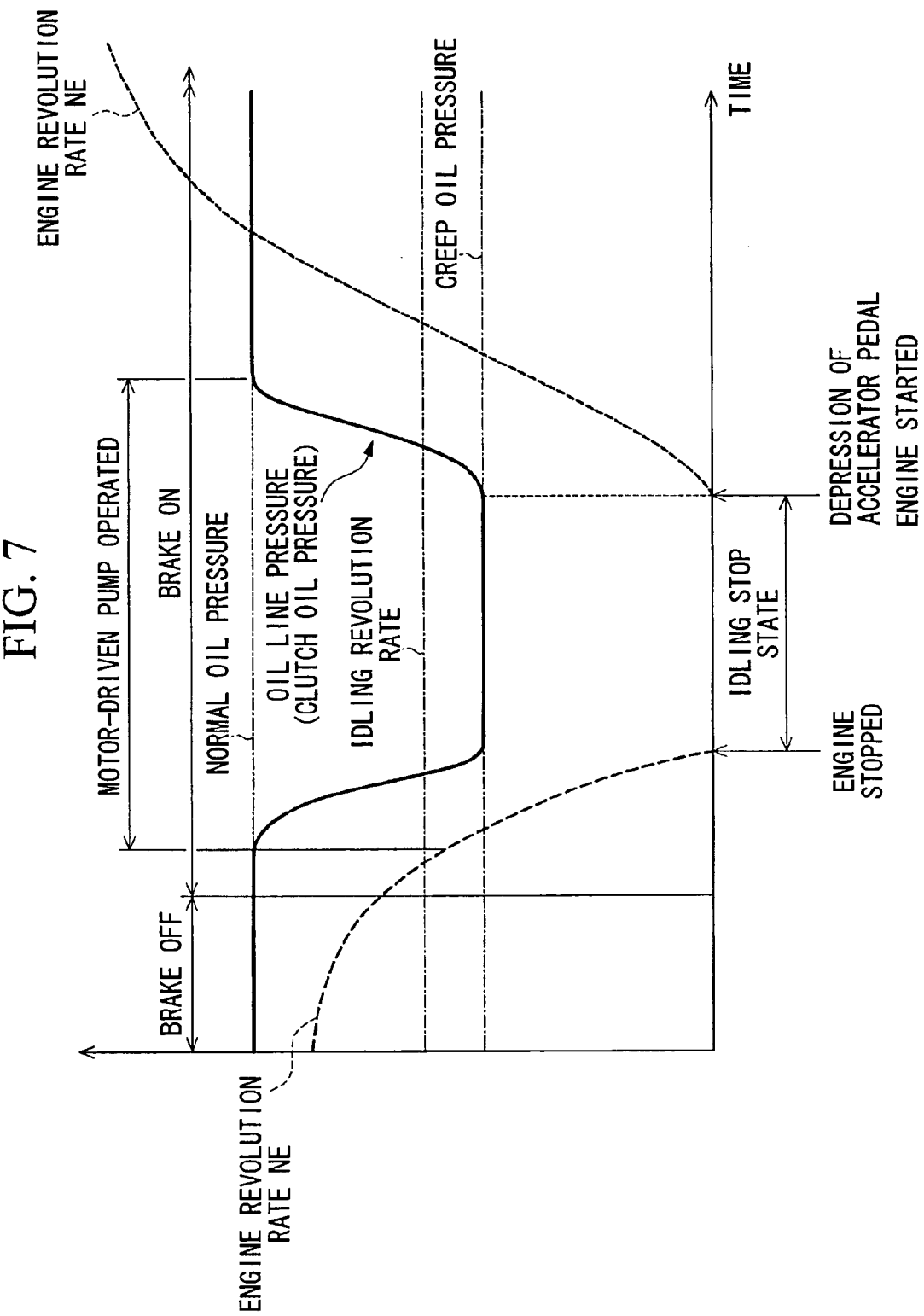
FIG. 7 is a time-domain chart (a fifth control pattern) showing changes in the oil line pressure and the clutch oil pressure when the engine is automatically started in the above embodiment.

Exemplary Situation in which the Accelerator Pedal is Depressed While the Brake Pedal is Depressed during the Idling Stop State FIG. 7 shows a control pattern in which the engine is automatically started upon the depression of the accelerator pedal while the brake pedal is maintained to be depressed during the idling stop state. The above conditions correspond to a situation in which, for example, the vehicle is started on a slope. When the accelerator pedal is depressed immediately after the brake pedal is released at the starting of the vehicle after being stopped on a steep slope, the vehicle may move backward upon release of the brake pedal because the driving force corresponding to the creeping torque is not sufficient to hold or move the vehicle forward. In such cases, the driver may depress both the brake pedal and the accelerator pedal simultaneously, and then release the brake pedal in order to make the vehicle start while preventing the vehicle from moving backward.

When it is determined by the accelerator pedal sensor 17 that the accelerator pedal is depressed while it is determined by the brake switch 16 that the brake pedal is depressed during the idling stop state, an automatic starting operation for the engine 2 by the motor-generator 3 begins. In this case, substantially simultaneously with the start of the engine 2, the oil line pressure and the clutch oil pressure of the starting gear in the transmission 6 are controlled so as to gradually increase from the creep oil pressure to the normal oil pressure. Accordingly, the transmission torque in the transmission 6 can be smoothly increased from the creeping torque to the maximum torque of the engine 2 without having a substantial slip in the clutch 22 of the starting gear in accordance with increase in the engine torque after the accelerator pedal is depressed. As a result, the length of the service life of the clutch 22 may be enhanced, a comfortable starting performance without jolting of the vehicle may be obtained, and the drivability of the vehicle may be improved.

Figure 8:
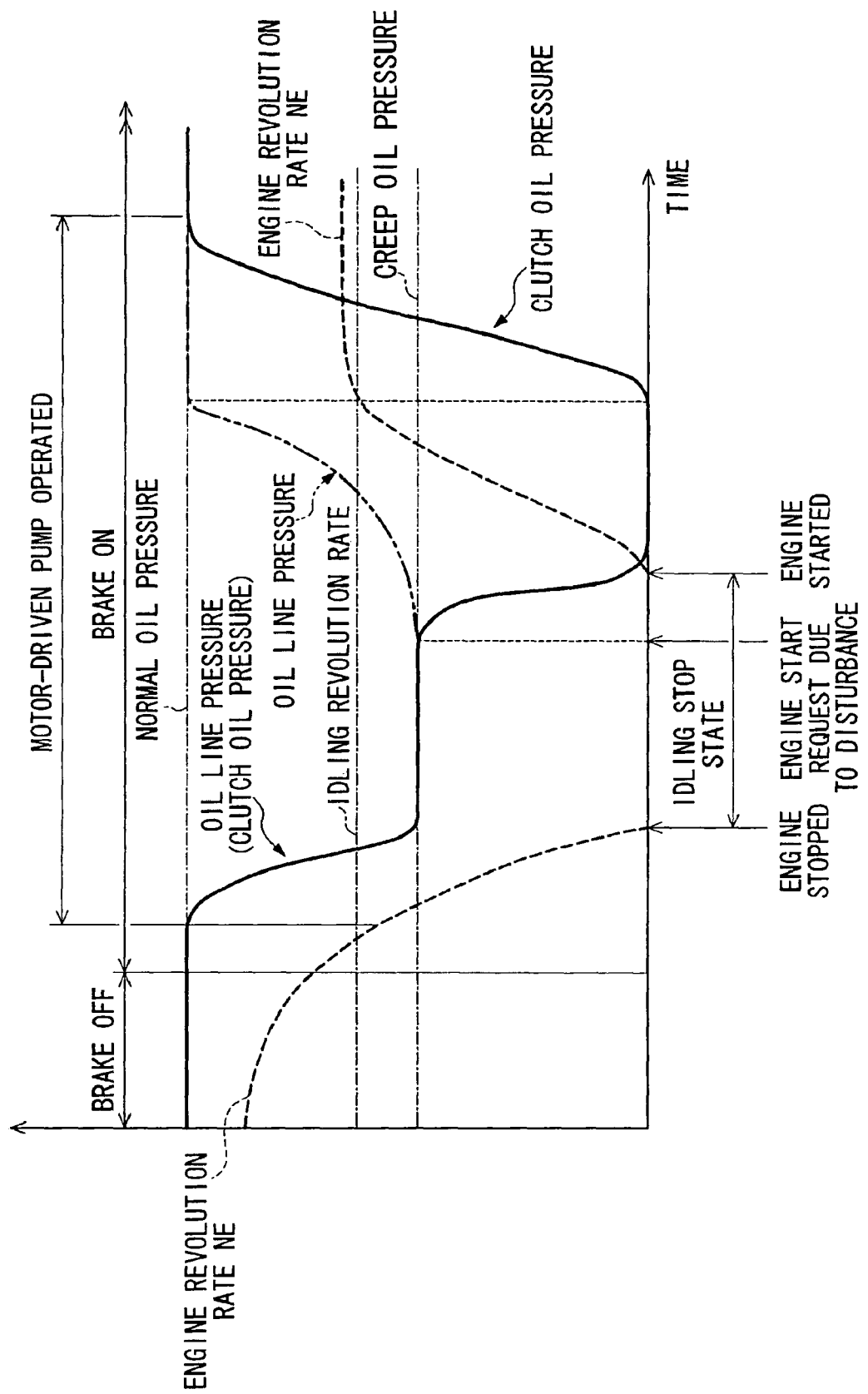
FIG. 8 is a time-domain chart (a sixth control pattern) showing changes in the oil line pressure and the clutch oil pressure when the engine is automatically started in the above embodiment.

Exemplary Situation in which an Engine Start Request Comes into Effect Due to a Disturbance During the Idling Stop State FIG. 8 shows a control pattern in which the engine is automatically started upon an engine start request due to a disturbance, i.e., the engine is automatically started regardless of the driver's intention to move the vehicle. Examples of such disturbances may be a situation in which the engine 2 should be started because the state of charge of the battery 10 is low, a situation in which a request for operating an engine-driven compressor is made during use of an air conditioning system of the vehicle, etc.

When an engine start request due to a disturbance comes into effect while it is determined by the brake switch 16 that the brake pedal is depressed during the idling stop state, the transmission 6 is placed in a neutral state substantially simultaneously with the engine start request, and the clutch oil pressure of the starting gear in the transmission 6 is controlled so as to be decreased toward substantially zero (a lower limit oil pressure). When the clutch oil pressure becomes substantially zero, an automatic starting operation for the engine 2 by the motor-generator 3 begins. When the engine revolution rate reaches the idling revolution rate, the gear position of the transmission 6 is shifted from neutral to the starting gear. The mechanical oil pump 11 is operated upon starting of the engine 2, and the oil line pressure is controlled so as to gradually increase to the normal oil pressure in accordance with increase in the engine revolution rate. On the other hand, the clutch oil pressure is controlled so as to be substantially zero until the engine revolution rate reaches the idling revolution rate.

As explained above, the transmission 6 is placed in the neutral state from when the engine start request due to a disturbance comes into effect and during the control operation in which the clutch oil pressure is made to decrease, and the clutch oil pressure of the starting gear is maintained to be zero from the start of the engine 2 until the engine revolution rate reaches the idling revolution rate during which the transmission torque in the transmission 6 can be maintained to be zero. As a result, the output shaft of the vehicle is reliably prevented from being provided with an unexpected torque, and unexpected behavior of the vehicle can be reliably prevented.

When the engine revolution rate reaches the idling revolution rate after increasing, the clutch oil pressure is controlled so as to gradually increase from zero toward the normal oil pressure. As a result, the transmission torque in the transmission 6 can be gradually increased from zero to the maximum torque of the engine 2, and preparation is completed for smoothly increasing the transmission torque in the transmission in accordance with increase in the engine torque which will be caused by the forthcoming depression of the accelerator pedal.

Accordingly, when the accelerator pedal is subsequently depressed, the transmission torque in the transmission 6 can be smoothly increased without having a substantial slip in the clutch 22 of the starting gear in accordance with increase in the engine torque after the accelerator pedal is depressed. As a result, the length of the service life of the clutch 22 may be enhanced, a comfortable starting performance without jolting of the vehicle may be obtained, and the drivability of the vehicle may be improved.

Next, an example of a hydraulic control operation, which is executed in the control patterns shown in FIGS. 3, 5, 7, and 8 when the engine 2 is automatically started in the hybrid vehicle 1, will be explained with reference to the flowcharts shown in FIGS. 9 and 10.

Figure 9:
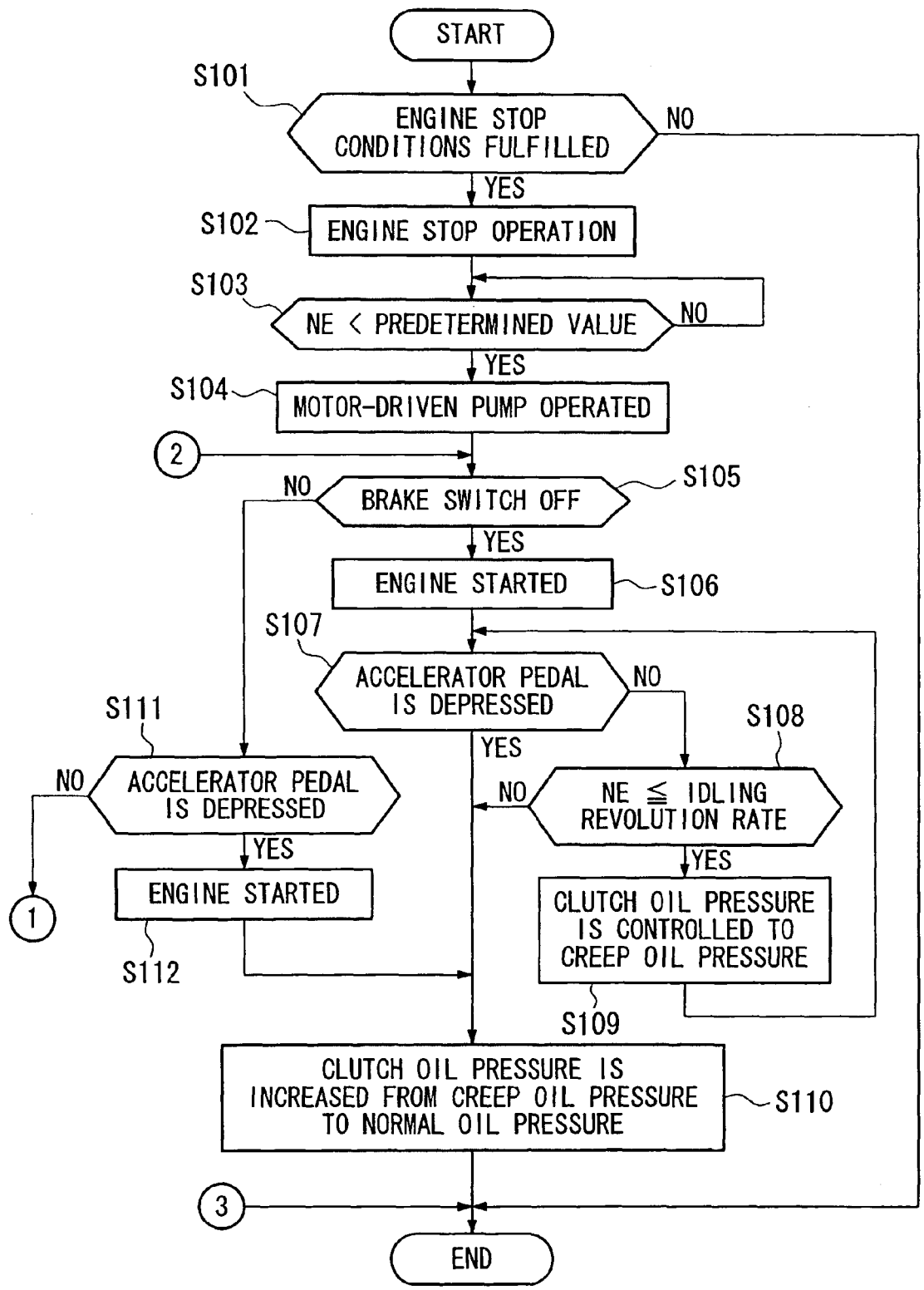
FIG. 9 is a flowchart (part 1) showing a hydraulic control operation when the engine is automatically started in the above embodiment.
Figure 10:
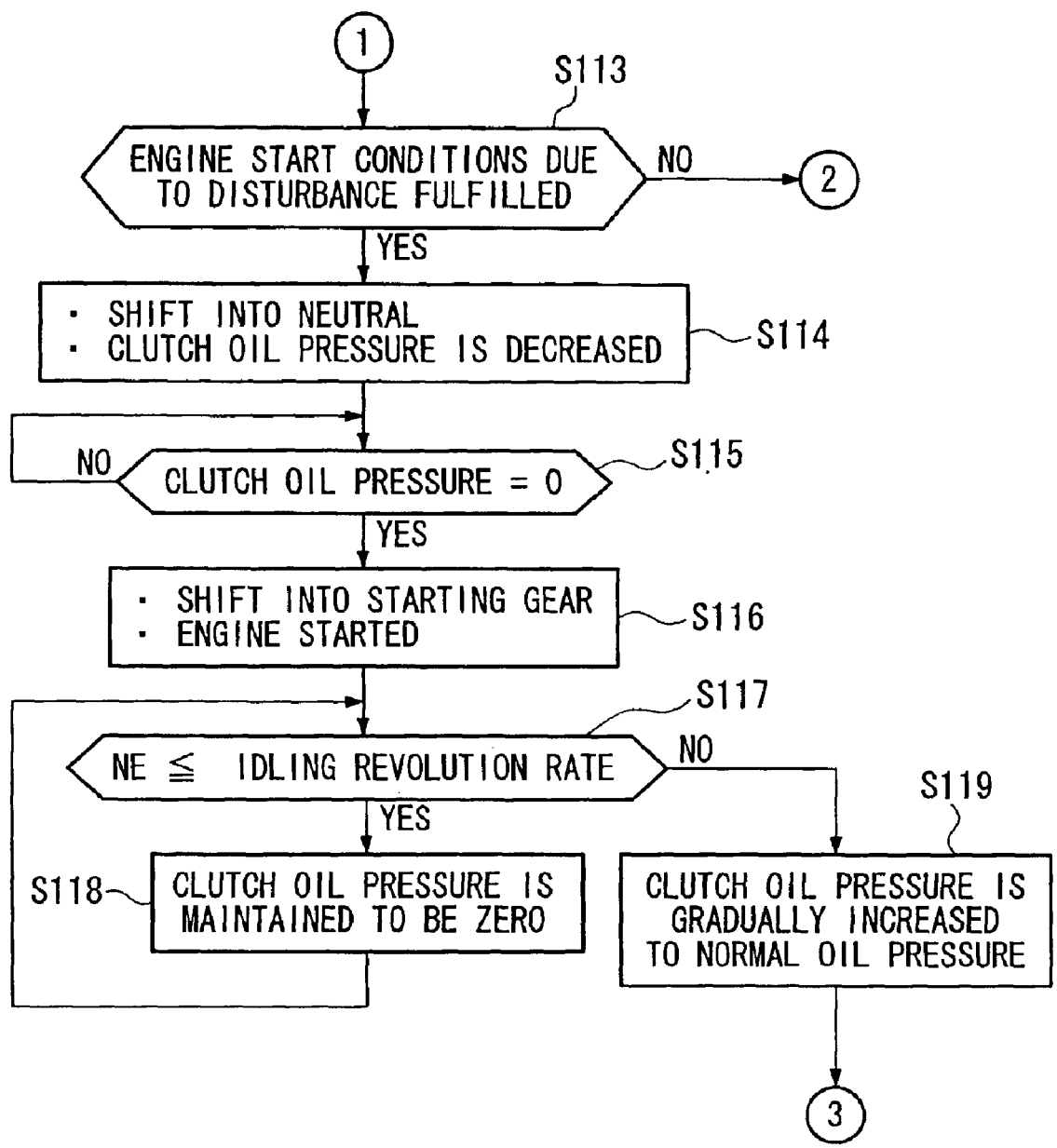
FIG. 10 is a flowchart (part 2) showing a hydraulic control operation when the engine is automatically started in the above embodiment.

The flowcharts shown in FIGS. 9 and 10 illustrate a hydraulic control routine for automatically starting the engine 2, and this hydraulic control routine is executed by the ECU 8.

When the execution of the hydraulic control routine is started, the engine 2 of the hybrid vehicle 1 is assumed to be operated, and accordingly, the mechanical oil pump 11 is also assumed to be operated.

In step S101, it is determined whether the engine stop conditions are fulfilled. When the result of the determination in step S101 is "NO" (i.e., the engine stop conditions are not fulfilled), the execution of this control routine is once terminated. When the result of the determination in step S101 is "YES" (i.e., the engine stop conditions are fulfilled), the operation proceeds to step S102, in which an engine stop operation, which includes suspending fuel injection to each of the cylinders of the engine 2, is executed.

Next, the operation proceeds to step S103, in which it is determined whether the engine revolution rate NE measured by the engine revolution rate sensor 18 is less than a predetermined value (i.e., an engine revolution rate for starting the motor-driven oil pump 12). When the result of the determination in step S103 is "YES" (i.e., NE<the predetermined value), the operation proceeds to step S104, in which the motor-driven oil pump 12 is started. In contrast, when the result of the determination in step S103 is "NO" (i.e., NE≧the predetermined value), a new engine revolution rate NE is read in as the next routine, and the determination is repeated.

Next, the operation proceeds to step S105, in which it is determined whether the brake switch 16 is in the "OFF" state. When the result of the determination in step S105 is "YES" (i.e., the brake switch 16 is in the "OFF" state), the operation proceeds to step S106, in which the engine 2 is started, and then the operation proceeds to step S107, in which it is determined whether the accelerator pedal is depressed based on the output signal of the accelerator pedal sensor 17.

When the result of the determination in step S107 is "NO" (i.e., the accelerator pedal is not depressed), the operation proceeds to step S108, in which it is determined whether the engine revolution rate NE measured by the engine revolution rate sensor 18 is equal to or less than the idling revolution rate.

When the result of the determination in step S108 is "YES" (i.e., NE≦the idling revolution rate), the operation proceeds to step S109, in which the clutch oil pressure is controlled so as to be maintained to be the creep oil pressure. In contrast, when the result of the determination in step S108 is "NO" (i.e., NE>the idling revolution rate), the operation proceeds to step S110, in which the clutch oil pressure is controlled so as to increase from the creep oil pressure to the normal oil pressure, and the execution of this control routine is once terminated. By executing a series of operations in steps S105 to S110, the hydraulic control operation shown in FIG. 3 is performed.

In contrast, when the result of the determination in step S107 is "YES" (i.e., the accelerator pedal is depressed), the operation proceeds to step S110, in which the clutch oil pressure is controlled so as to increase from the creep oil pressure to the normal oil pressure, and the execution of this control routine is once terminated. By executing a series of operations in steps S105, S106, S107, and S110, the hydraulic control operation shown in FIG. 5 is performed.

When the result of the determination in step S105 is "NO" (i.e., the brake switch 16 is in the "ON" state), the operation proceeds to step S111, in which it is determined whether the accelerator pedal is depressed based on the output signal of the accelerator pedal sensor 17. When the result of the determination in step S111 is "YES" (i.e., the accelerator pedal is depressed), the operation proceeds to step S112, in which the engine 2 is started, and the operation proceeds to step S110, in which the clutch oil pressure is controlled so as to increase from the creep oil pressure to the normal oil pressure, and then the execution of this control routine is once terminated. By executing a series of operations in steps S105, S110, S112, and S110, the hydraulic control operation shown in FIG. 7 is performed.

When the result of the determination in step S111 is "NO" (i.e., the accelerator pedal is not depressed), the operation proceeds to step S113, in which it is determined whether the engine start conditions due to a disturbance are fulfilled.

When the result of the determination in step S113 is "NO" (i.e., the engine start conditions are not fulfilled), the operation returns to step S105, and when the result of the determination in step S113 is "YES" (i.e., the engine start conditions are fulfilled), the operation proceeds to step S114, in which the gear position in the transmission 6 is shifted into the neutral state, and the clutch oil pressure is controlled so as to decrease toward zero. Next, the operation proceeds to step S115, in which it is determined whether the clutch oil pressure is zero.

When the result of the determination in step S115 is "YES" (i.e., the clutch oil pressure=0), the operation proceeds to step S116, in which the gear position in the transmission 6 is shifted into the starting gear, and the engine 2 is started. In contrast, when the result of the determination in step S115 is "NO" (i.e., the clutch oil pressure>0), a new clutch oil pressure is read in as the next routine, and the determination is repeated.

Next, the operation proceeds to step S117, in which it is determined whether the engine revolution rate NE measured by the engine revolution rate sensor 18 is equal to or less than the idling revolution rate.

When the result of the determination in step S117 is "YES" (i.e., NE≦the idling revolution rate), the operation proceeds to step S118, in which the clutch oil pressure is controlled so as to be maintained to be zero, and the operation returns to step S117, in which a new engine revolution rate NE is read in as the next routine, and the determination is repeated.

In contrast, when the result of the determination in step S117 is "NO" (i.e., NE>the idling revolution rate), the operation proceeds to step S119, in which the clutch oil pressure is controlled so as to gradually increase from zero to the normal oil pressure, and the execution of this control routine is once terminated. By executing a series of operations in steps S105, S111, and S113 to S119, the hydraulic control operation shown in FIG. 8 is performed.

Next, an example of a hydraulic control operation, which is executed in the control patterns shown in FIGS. 4 and 6 when the engine 2 is automatically started in the hybrid vehicle 1, will be explained with reference to the flowchart shown in FIG. 11.

The flowchart shown in FIG. 11 mainly illustrates portions different from those in the flowcharts shown in FIGS. 9 and 10, and the same step numbers are applied to the same those in the flowcharts shown in FIGS. 9 and 10 will be mainly explained below.

Steps S101 to S104 are common to steps S101 to S104 shown in FIG. 9; therefore, illustrations and explanations thereof are omitted.

In step S105, it is determined whether the brake switch 16 is in the "OFF" state. When the result of the determination in step S105 is "YES" (i.e., the brake switch 16 is in the "OFF" state), the operation proceeds to step S106, in which the engine 2 is started, and then the operation proceeds to step S120, in which the clutch oil pressure is controlled so as to decrease toward zero.

Next, the operation proceeds to step S121, in which it is determined whether the accelerator pedal is depressed based on the output signal of the accelerator pedal sensor 17.

When the result of the determination in step S121 is "NO" (i.e., the accelerator pedal is not depressed), the operation proceeds to step S122, in which it is determined whether a predetermined time "t" has passed since the engine 2 was automatically started. When the result of the determination in step S122 is "NO" (i.e., the predetermined time "t" has not passed), the operation returns to step S120. When the result of the determination in step S122 is "YES" (i.e., the predetermined time "t" has passed), the operation proceeds to step S123, in which the clutch oil pressure, which has been controlled so as to decrease, is controlled so as to gradually increase to the normal oil pressure, and the execution of this control routine is once terminated. By executing a series of operations in steps S 105, S 106, and S120 to S123, the hydraulic control operation shown in FIG. 4 is performed.

In contrast, when the result of the determination in step S121 is "YES" (i.e., the accelerator pedal is depressed), the operation proceeds to step S123, in which the clutch oil pressure, which has been controlled so as to decrease, is controlled so as to gradually increase to the normal oil pressure, and the execution of this control routine is once terminated. By executing a series of operations in steps S105, S106, S120, S121, and S123, the hydraulic control operation shown in FIG. 6 is performed.

When the result of the determination in step S105 is "NO" (i.e., the brake switch 16 is in the "ON" state) as in the case of the flowchart shown in FIG. 9, the operation proceeds to step S111. When the result of the determination in step S111 is "YES", the operations in steps S112 and S110 are executed, and the execution of this control routine is once terminated. When the result of the determination in step S111 is "NO", the operations in steps S113 to S119 are executed, and the execution of this control routine is once terminated.

Figure 11:
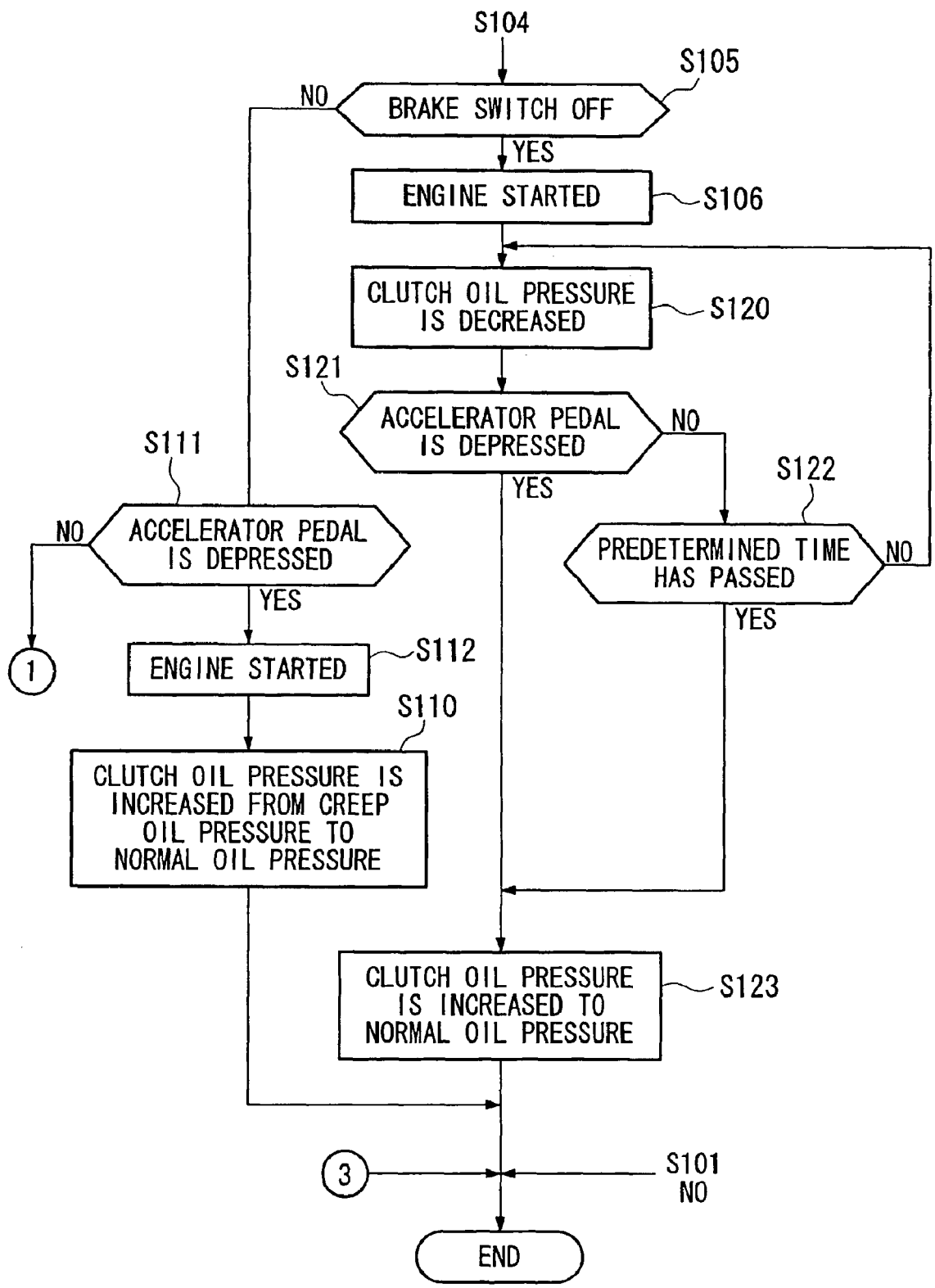
FIG. 11 is a flowchart (part 3) showing a hydraulic control operation when the engine is automatically started in the above embodiment.

In this embodiment, the operational steps in the flowcharts shown in FIGS. 9 to 11 are executed by the ECU 8, whereby a hydraulic control apparatus for a hybrid vehicle is realized.

Other Embodiments

The present invention is not limited to the above embodiment.

For example, in the above embodiment, the present invention is applied to the hybrid vehicle in which the engine and the motor-generator are directly connected to each other; however, the present invention may be applied to another type of hybrid vehicle in which an engine and a motor-generator are disposed in parallel, and the vehicle is driven using at least one of the driving powers of the engine and the motor-generator.

Moreover, in the above embodiment, the hybrid vehicle includes the mechanical oil pump and the motor-driven oil pump as the hydraulic power sources for the transmission; however, the present invention may be applied to other types of hybrid vehicle in which a mechanical oil pump is not provided and merely a motor-driven oil pump is used for applying hydraulic pressure to a transmission.

Advantageous Effects Obtainable by the Invention

As explained above, according to the hydraulic control apparatus for a hybrid vehicle of the present invention, when the engine is automatically started upon the release of the brake pedal, the accelerator pedal has not been depressed yet, and the engine revolution rate has not reached the idling revolution rate, i.e., when the engine torque is unstable, the transmission torque in the transmission can be limited to a level that is less than a torque transmittable with the first oil pressure; therefore, the vehicle is prevented from being provided with an excessive driving force. In addition, preparation is completed for smoothly transmitting torque in the subsequent state in which the engine revolution rate exceeds the idling revolution rate.

According to another hydraulic control apparatus for a hybrid vehicle of the present invention, when the engine is automatically started upon the release of the brake pedal, and even if the transmission torque in the transmission is increased prior to the depression of the accelerator pedal from a torque transmittable with the first oil pressure to a torque transmittable with the second oil pressure, the driving force of the vehicle can be maintained to be a level corresponding to the idling revolution rate until the accelerator pedal is depressed. Moreover, preparation is completed for smoothly increasing the transmission torque in the transmission in accordance with increase in the engine torque which will be caused by the forthcoming depression of the accelerator pedal.

According to another hydraulic control apparatus for a hybrid vehicle of the present invention, when the brake pedal is released while the engine is automatically stopped, and the engine is thereby automatically started, the transmission torque in the transmission can be made less than a torque transmittable with the first oil pressure in a predetermined period from immediately after the engine is started in which the engine torque is unstable; therefore, the output shaft of the vehicle is reliably prevented from being provided with an unexpected torque, and unexpected behavior of the vehicle can be reliably prevented. Moreover, the transmission torque in the transmission may be increased to a torque transmittable with the second oil pressure prior to the depression of the accelerator pedal when the predetermined period has passed; therefore, preparation is completed for smoothly increasing the transmission torque in the transmission in accordance with increase in the engine torque which will be caused by the forthcoming depression of the accelerator pedal, while on the other hand, the driving force of the vehicle can be maintained to be a level corresponding to the idling revolution rate until the accelerator pedal is depressed.

According to another hydraulic control apparatus for a hybrid vehicle of the present invention, when the brake pedal is released while the engine is automatically stopped, the engine is thereby automatically started, and the accelerator pedal is depressed, the transmission torque in the transmission can be increased from a torque transmittable with the first oil pressure to a torque transmittable with the second oil pressure regardless of the level of the engine revolution rate; therefore, the transmission torque in the transmission can be smoothly increased without having a substantial slip in the clutch in accordance with increase in the engine torque which is caused by the subsequent depression of the accelerator pedal. As a result, the length of the service life of the clutch may be enhanced, a comfortable starting performance without jolting of the vehicle may be obtained, and the drivability of the vehicle may be improved.

According to another hydraulic control apparatus for a hybrid vehicle of the present invention, when the brake pedal is released while the engine is automatically stopped, the engine is thereby automatically started, and when the engine torque is unstable immediately after the engine is started, the transmission torque in the transmission can be made less than a torque transmittable with the first oil pressure; therefore, the output shaft of the vehicle is reliably prevented from being provided with an unexpected torque, and unexpected behavior of the vehicle can be reliably prevented until the accelerator pedal is depressed. Subsequently, when the accelerator pedal is depressed, the transmission torque in the transmission can be increased to a torque transmittable with the second oil pressure; therefore, the transmission torque in the transmission can be smoothly increased without having a substantial slip in the clutch in accordance with increase in the engine torque which is caused by the subsequent depression of the accelerator pedal. As a result, the length of the service life of the clutch may be enhanced, a comfortable starting performance without jolting of the vehicle may be obtained, and the drivability of the vehicle may be improved.

According to another hydraulic control apparatus for a hybrid vehicle of the present invention, when the brake pedal is depressed while the engine is automatically stopped, and the engine is automatically started upon depression of the accelerator pedal, the transmission torque in the transmission can be increased from a torque transmittable with the first oil pressure to a torque transmittable with the second oil pressure regardless of the level of the engine revolution rate; therefore, the transmission torque in the transmission can be smoothly increased without having a substantial slip in the clutch in accordance with increase in the engine torque which is caused by the depression of the accelerator pedal. As a result, the length of the service life of the clutch may be enhanced, a comfortable starting performance without jolting of the vehicle may be obtained even when the brake pedal is subsequently released, and the drivability of the vehicle may be improved.

According to another hydraulic control apparatus for a hybrid vehicle of the present invention, when the brake pedal is depressed and the accelerator pedal is not depressed while the engine is automatically stopped, and the engine is automatically started not upon the driver's intention to move the vehicle, but upon detecting a disturbance, the transmission torque in the transmission can be limited to a level that is less than a torque transmittable with the lower limit oil pressure until the engine revolution rate reaches the idling revolution rate; therefore, the output shaft of the vehicle is reliably prevented from being provided with an unexpected torque, and unexpected behavior of the vehicle can be reliably prevented. Moreover, when the engine revolution rate exceeds the idling revolution rate, the transmission torque in the transmission can be increased from a torque transmittable with the lower limit oil pressure to a torque transmittable with the second oil pressure; therefore, preparation is completed for smoothly increasing the transmission torque in the transmission in accordance with increase in the engine torque which will be caused by the forthcoming depression of the accelerator pedal.

According to another hydraulic control apparatus for a hybrid vehicle of the present invention, when the brake pedal is depressed and the accelerator pedal is not depressed while the engine is automatically stopped, and the engine is automatically started not upon the driver's intention to move the vehicle, but upon detecting a disturbance, the transmission torque in the transmission can be decreased to be substantially zero; therefore, the output shaft of the vehicle is reliably prevented from being provided with an unexpected torque, and unexpected behavior of the vehicle can be reliably prevented.

According to another hydraulic control apparatus for a hybrid vehicle of the present invention, when the oil pressure applied to the clutch is controlled to be the first oil pressure. the creeping torque can be applied to the vehicle.

According to the above apparatus for a hybrid vehicle, when the oil pressure applied to the clutch is controlled to be the second oil pressure, the maximum torque of the engine can be applied to the vehicle.

According to another hydraulic control apparatus for a hybrid vehicle of the present invention, the hybrid vehicle has at least one of the mechanical oil pump and the motor-driven oil pump, and the oil pressure applied to the clutch can be controlled in such manners as described above when at least one of the mechanical oil pump and the motor-driven oil pump is operated. Moreover, the motor-driven oil pump may be a compact one, and electrical power consumption may be reduced.

What is claimed is:

1. A hydraulic control apparatus for a hybrid vehicle comprising:
    an engine and a motor as power sources of the hybrid vehicle;
    a transmission which is provided for transmitting powers of the engine and the motor to output shafts of the hybrid vehicle, and which includes a torque converter, a starting gear, and a clutch that controls an engagement state of the starting gear by being supplied with oil pressure;
    a hydraulic control circuit associated with the transmission;
    a motor-driven oil pump for supplying oil pressure to the hydraulic control circuit and the clutch;
    an engine automatic stop and start device which is associated with the engine in order to stop and start the engine under predetermined conditions;
    a control unit which is operatively connected to the engine automatic stop and start device, the motor-driven oil pump, and the hydraulic control circuit;

a brake pedal depression detecting device which is provided for detecting whether the brake pedal of the hybrid vehicle is depressed, and which is connected to the control unit;

an accelerator pedal depression detecting device which is provided for detecting whether the accelerator pedal of the hybrid vehicle is depressed, and which is connected to the control unit; and an engine revolution rate measuring device which is provided for sensing revolution rate of the engine, and which is connected to the control unit, wherein the control unit is adapted to control the motor-driven oil pump and the hydraulic control circuit so that the oil pressure applied to the clutch is set to be a first oil pressure while the engine is automatically stopped, wherein the control unit is adapted to operate the engine automatic stop and start device so as to start the engine when it is determined by the brake pedal depression detecting device that the brake pedal is released while the engine is automatically stopped, and wherein the control unit is adapted to control the motor-driven oil pump and the hydraulic control circuit so that the oil pressure applied to the clutch is maintained to be the first oil pressure when the engine is automatically started upon detecting release of the brake pedal, it is determined by the accelerator pedal depression detecting device that the accelerator pedal of the hybrid vehicle is not depressed, and it is determined by the engine revolution rate measuring device that the engine revolution rate is equal to or less than an idling revolution rate.

2. A hydraulic control apparatus for a hybrid vehicle according to claim 1, wherein the control unit is adapted to control the motor-driven oil pump and the hydraulic control circuit so that the oil pressure applied to the clutch is increased from the first oil pressure to a second oil pressure when it is determined by the engine revolution rate measuring device that the engine revolution rate exceeds the idling revolution rate.

3. A hydraulic control apparatus for a hybrid vehicle comprising:

an engine and a motor as power sources of the hybrid vehicle;

a transmission which is provided for transmitting powers of the engine and the motor to output shafts of the hybrid vehicle, and which includes a torque converter, a starting gear, and a clutch that controls an engagement state of the starting gear by being supplied with oil pressure;

a hydraulic control circuit associated with the transmission;

a motor-driven oil pump for supplying oil pressure to the hydraulic control circuit and the clutch;

an engine automatic stop and start device which is associated with the engine in order to stop and start the engine under predetermined conditions;

a control unit which is operatively connected to the engine automatic stop and start device, the motor-driven oil pump, and the hydraulic control circuit;

a brake pedal depression detecting device which is provided for detecting whether the brake pedal of the hybrid vehicle is depressed, and which is connected to the control unit;

an accelerator pedal depression detecting device which is provided for detecting whether the accelerator pedal of the hybrid vehicle is depressed, and which is connected to the control unit; and an engine revolution rate measuring device which is provided for sensing revolution rate of the engine, and which is connected to the control unit, wherein the control unit is adapted to control the motor-driven oil pump and the hydraulic control circuit so that the oil pressure applied to the clutch is set to be a first oil pressure while the engine is automatically stopped, wherein the control unit is adapted to operate the engine automatic stop and start device so as to start the engine when it is determined by the brake pedal depression detecting device that the brake pedal is released while the engine is automatically stopped, and wherein the control unit is adapted to control the motor-driven oil pump and the hydraulic control circuit so that the oil pressure applied to the clutch is decreased from the first oil pressure when the engine is automatically started upon detecting release of the brake pedal, and it is determined by the accelerator pedal depression detecting device that the accelerator pedal of the hybrid vehicle is not depressed, and then to control the motor-driven oil pump and the hydraulic control circuit so that the oil pressure applied to the clutch is increased to a second oil pressure which is greater than the first oil pressure when it is determined by the engine revolution rate measuring device that the engine revolution rate exceeds a predetermined revolution rate or when it is determined that a predetermined time has passed since the engine was automatically started.

4. A hydraulic control apparatus for a hybrid vehicle comprising:

an engine and a motor as power sources of the hybrid vehicle;

a transmission which is provided for transmitting powers of the engine and the motor to output shafts of the hybrid vehicle, and which includes a torque converter, a starting gear, and a clutch that controls an engagement state of the starting gear by being supplied with oil pressure;

a hydraulic control circuit associated with the transmission;

a motor-driven oil pump for supplying oil pressure to the hydraulic control circuit and the clutch;

an engine automatic stop and start device which is associated with the engine in order to stop and start the engine under predetermined conditions;

a control unit which is operatively connected to the engine automatic stop and start device, the motor-driven oil pump, and the hydraulic control circuit;

a brake pedal depression detecting device which is provided for detecting whether the brake pedal of the hybrid vehicle is depressed, and which is connected to the control unit; and an accelerator pedal depression detecting device which is provided for detecting whether the accelerator pedal of the hybrid vehicle is depressed, and which is connected to the control unit, wherein the control unit is adapted to control the motor-driven oil pump and the hydraulic control circuit so that the oil pressure applied to the clutch is set to be a first oil pressure during an idling stop operation of the engine, wherein the control unit is adapted to operate the engine automatic stop and start device so as to start the engine when it is determined by the brake pedal depression detecting device that the brake pedal is released while the engine is automatically stopped, and wherein the control unit is adapted to control the motor-driven oil pump and the hydraulic control circuit so that the oil pressure applied to the clutch is decreased from the first oil pressure when the engine is automatically started upon detecting release of the brake pedal, and it is determined by the accelerator pedal depression detecting device that the accelerator pedal of the hybrid vehicle is not depressed, and then to control the motor-driven oil pump and the hydraulic control circuit so that the oil pressure applied to the clutch is increased to a second oil pressure which is greater than the first oil pressure when it is determined by the accelerator pedal depression detecting device that the accelerator pedal of the hybrid vehicle is depressed.

5. A hydraulic control apparatus for a hybrid vehicle comprising:

an engine and a motor as power sources of the hybrid vehicle;

a transmission which is provided for transmitting powers of the engine and the motor to output shafts of the hybrid vehicle, and which includes a torque converter, a starting gear, and a clutch that controls an engagement state of the starting gear by being supplied with oil pressure;

a hydraulic control circuit associated with the transmission;

a motor-driven oil pump for supplying oil pressure to the hydraulic control circuit and the clutch;

an engine automatic stop and start device which is associated with the engine in order to stop and start the engine under predetermined conditions;

a control unit which is operatively connected to the engine automatic stop and start device, the motor-driven oil pump, and the hydraulic control circuit;

a brake pedal depression detecting device which is provided for detecting whether the brake pedal of the hybrid vehicle is depressed, and which is connected to the control unit; and an accelerator pedal depression detecting device which is provided for detecting whether the accelerator pedal of the hybrid vehicle is depressed, and which is connected to the control unit, wherein the control unit is adapted to control the motor-driven oil pump and the hydraulic control circuit so that the oil pressure applied to the clutch is set to be a first oil pressure while the engine is automatically stopped, and wherein the control unit is adapted to control the motor-driven oil pump and the hydraulic control circuit so that the oil pressure applied to the clutch is increased from the first oil pressure to a second oil pressure when it is determined by the brake pedal depression detecting device that the brake pedal is depressed, and it is determined by the accelerator pedal depression detecting device that the accelerator pedal of the hybrid vehicle is depressed while the engine is automatically stopped.

6. A hydraulic control apparatus for a hybrid vehicle comprising:

an engine and a motor as power sources of the hybrid vehicle;

a transmission which is provided for transmitting powers of the engine and the motor to output shafts of the hybrid vehicle, and which includes a torque converter, a starting gear, and a clutch that controls an engagement state of the starting gear by being supplied with oil pressure;

a hydraulic control circuit associated with the transmission;

a motor-driven oil pump for supplying oil pressure to the hydraulic control circuit and the clutch;

an engine automatic stop and start device which is associated with the engine in order to stop and start the engine under predetermined conditions;

a control unit which is operatively connected to the engine automatic stop and start device, the motor-driven oil pump, and the hydraulic control circuit;

a brake pedal depression detecting device which is provided for detecting whether the brake pedal of the hybrid vehicle is depressed, and which is connected to the control unit;

an accelerator pedal depression detecting device which is provided for detecting whether the accelerator pedal of the hybrid vehicle is depressed, and which is connected to the control unit; and an engine revolution rate measuring device which is provided for sensing revolution rate of the engine, and which is connected to the control unit, wherein the control unit is adapted to control the motor-driven oil pump and the hydraulic control circuit so that the oil pressure applied to the clutch is set to be a first oil pressure while the engine is automatically stopped, wherein the control unit is adapted to operate the engine automatic stop and start device so as to start the engine when predetermined conditions for starting the engine, regardless of the driver's intention to move the vehicle, are fulfilled while the engine is automatically stopped, wherein the control unit is adapted to control the motor-driven oil pump and the hydraulic control circuit so that the oil pressure applied to the clutch is decreased from the first oil pressure to a lower limit oil pressure when the engine is automatically started upon detecting a disturbance, it is determined by the brake pedal depression detecting device that the brake pedal is depressed, and it is determined by the accelerator pedal depression detecting device that the accelerator pedal of the hybrid vehicle is not depressed, and wherein the control unit is adapted to control the motor-driven oil pump and the hydraulic control circuit so that the oil pressure applied to the clutch is increased from the lower limit oil pressure to a second oil pressure which is greater than the first oil pressure when it is determined by the engine revolution rate measuring device that the engine revolution rate exceeds the idling revolution rate.

7. A hydraulic control apparatus for a hybrid vehicle according to claim 6, wherein the lower limit oil pressure is set to be substantially zero.

8. A hydraulic control apparatus for a hybrid vehicle according to claim 6, wherein the predetermined conditions for starting the engine, regardless of the driver's intention to move the vehicle, include at least one of the cases in which a request is made by an air conditioning system of the hybrid vehicle to operate an engine-driven compressor, and in which a request is made to charge a battery, which is provided for operating the motor, because the state of charge of the battery is low.

9. A hydraulic control apparatus for a hybrid vehicle according to one of claims 1 to 3 and 4 to 8, wherein the first oil pressure is set to be an oil pressure which is required for transmitting a creeping torque.

10. A hydraulic control apparatus for a hybrid vehicle according to one of claims 2, 3 and 4 to 8, wherein the second oil pressure is set to be an oil pressure which is required for transmitting a maximum torque of the engine.

11. A hydraulic control apparatus for a hybrid vehicle according to one of claims 1 to 3 and 4 to 8, further comprising a mechanical oil pump which is driven by at least one of the engine and the motor, and which supplies oil pressure to the hydraulic control circuit and the clutch, wherein the control unit is adapted to operate the motor-driven oil pump when the engine is automatically stopped.

* * * * *